United States Patent [19]
Fields et al.

[11] Patent Number: 5,459,656
[45] Date of Patent: Oct. 17, 1995

[54] BUSINESS DEMAND PROJECTION SYSTEM AND METHOD

[75] Inventors: Randall K. Fields, Woodland; Paul R. Quinn, Park City; Barrie R. Tondevold, Murray; Jamie T. Pond, Salt Lake City, all of Utah

[73] Assignee: Park City Group, Inc.

[21] Appl. No.: 23,111

[22] Filed: Feb. 26, 1993

Related U.S. Application Data

[63] Continuation-in-part of Ser. No. 808,982, Dec. 17, 1991, Pat. No. 5,299,115, which is a continuation of Ser. No. 406,069, Sep. 12, 1989, abandoned.

[51] Int. Cl.[6] .................................................. G06F 19/00
[52] U.S. Cl. ..................................... 364/401; 364/468
[58] Field of Search .................................. 364/400, 401, 364/408, 406, 492, 468; 395/600, 925

[56] References Cited

U.S. PATENT DOCUMENTS

| | | | |
|---|---|---|---|
| 4,106,097 | 8/1978 | Fox et al. | 364/492 |
| 4,110,825 | 8/1978 | Fox et al. | 364/492 |
| 4,136,393 | 1/1979 | Fox | 364/492 |
| 4,141,069 | 2/1979 | Fox | 364/493 |
| 4,542,469 | 9/1985 | Brandyberry et al. | 364/492 |
| 5,111,391 | 5/1992 | Fields et al. | 364/401 |
| 5,287,267 | 2/1994 | Jayaraman et al. | 364/401 |
| 5,299,115 | 3/1994 | Fields et al. | 364/401 |

*Primary Examiner*—Gail O. Hayes
*Assistant Examiner*—J. L. Hazard
*Attorney, Agent, or Firm*—Fenwick & West

[57] ABSTRACT

A business demand based control system and method stores past business demand data during past time intervals for use with other data to compute business demands in such manner that the past business demand data is used to project the business demands in current and near-future time intervals. The system measures and stores the business demand data for a plurality of time intervals and a plurality of products or tasks, and projects the business demand for a plurality of products or tasks for near-future time intervals using percentage based demand curves. The system allows the creation of a number of demand curves for the items to determine near future demand, using defined functions and variables. Business demand projections for current and near-future time intervals are revised for a plurality of business items in response to variances in actual business demand data in time intervals just prior to the current time interval.

35 Claims, 12 Drawing Sheets

BUSINESS DEMAND PROJECTION SYSTEM AND METHOD

RELATED APPLICATION

This application is a continuation in part of the previously filed application Ser. No. 07/808,982, now U.S. Pat. No. 5,299,115 issued Mar. 29, 1994, filed on Dec. 17, 1991, by Randall K. Fields, Paul R. Quinn and Barrie R. Tondevoid, entitled PRODUCT DEMAND SYSTEM AND METHOD which was a file wrapper continuation application of Ser. No. 07/406,069, now abandoned, filed on Sep. 12, 1989 inventor Fields, et. al., entitled PRODUCT DEMAND SYSTEM AND METHOD.

BACKGROUND OF THE INVENTION

1. Field of Invention

This invention relates to systems and methods for analyzing and predicting business demand based on historical demand and changes in actual current demand.

2. Background of the Invention

In production planning for a business environment, such as a retail business offering products of short shelf life like foodstuffs, or more generally in any business requiring a series of various tasks depending on changes in demand for the business's offerings, a tendency exists toward using production plans that are calculated on an infrequent basis. This basis is often daily at best but more often is based on average daily or weekly sales. This results in excessive product and waste where demand is below production, or lost revenue where there is not enough production to meet customer demand. It is impractical, if not impossible, for a human being to calculate business demand on a more frequent basis such as hourly or every fifteen minutes, which would be more suited to determining varying business demand levels during daily operations.

In addition to the impracticality of computing business demand manually on a more frequent basis is the complexity introduced by different demand patterns for each day of the week, seasons of the year, or other recurring events. Customer foot traffic and product preferences are unique to each day of the week. These traffic patterns and preferences are further complicated by seasonality trends week by week throughout the year. In addition, promotional programs, local events, holidays, and the like, all alter the demand levels faced by a business. Accommodating this level of complexity requires storing and using the past business demand according to a model that accounts for the seasonality, day of the week, and time intervals during the business day, for each of a plurality of products or business items to determine future business demand for a specific location.

Another difficulty encountered once the past business demand has been stored is the ability to deal with incomplete data from current time periods and to compare trends in just-completed time intervals against projected demand in the equal time intervals in order to adjust the production or business item in near-future time intervals accurately and with confidence. One method for making such comparisons and projections on other near-future intervals is to take a simple positive or negative percentage of the trend of just-completed periods against projected periods and apply it to the remaining projected near future periods for the day. This method is unreliable given the many anomalies that can occur, for example, when a bus load of people arrives or an unusually large order is placed. What is needed is method of adjusting the projected demand levels in future intervals in proportion to both historical demand trends and current actual demand.

SUMMARY OF THE INVENTION

The present invention provides a system and method for analyzing business demand which incorporates tracking of past business demand for a plurality of products or tasks, time intervals during the day, and other factors, storing actual demand data as both actual demand values and in percentage based time curves. The actual total demand data is used to project target totals for each of the products or tasks in a business day. These totals are then distributed over the time intervals of the business day according to the percentage demand curves for each product or task, to project the demanded levels in those intervals. As actual demand is realized, the projected values for near future intervals are re-projected. Accordingly, more appropriate and accurate projection of future-business demand can be made.

DESCRIPTION OF THE PREFERRED EMBODIMENT

THE BUSINESS DEMAND CONTROL SYSTEM

Figure 1:
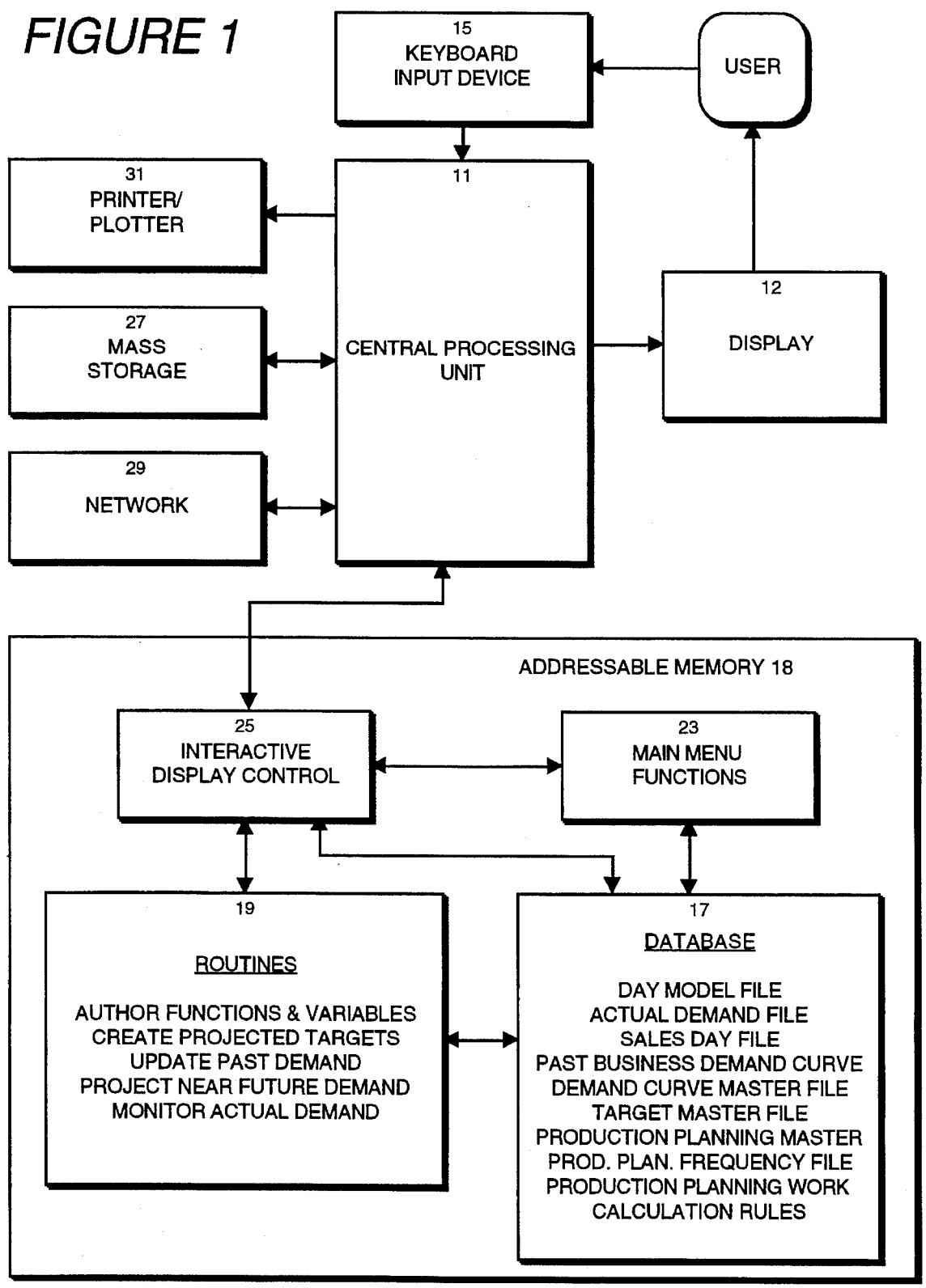
FIG. 1 is a block schematic diagram of a workstation for projecting production in accordance with CPU 11, and database 17, routines 19 in addressable memory 18.

Referring now to FIG. 1, there is shown a block schematic diagram of a workstation configured in accordance with one embodiment of the present invention to provide improved demand projection and production scheduling for a plurality of business items. Business items can include any type of quantifiable product or service that a business produces, including products or services for sale or internal use in the further production of other products or services. For example, business items can include not only the retail products a store might offer, but also its staffing requirements, the quantity or costs of raw materials and supplies, and production tasks involved in producing its products, such as discrete manufacturing steps, restocking inventory, ordering more supplies, etc. Any production task which has an identifiable starting point, duration, and frequency can be evaluated by the system.

In FIG. 1, central processing unit (CPU) 11 is connected to control the display device 12 in response to inputs supplied to the CPU 11 via the user's manipulation of the keyboard 15, or via other inputs supplied through a conventional network interface 29 (e.g., modem, barcode readers, standard network bus, and the like). The CPU 11 accesses memory 18 which contains information that is supplied via the keyboard 15 or the network 29 (e.g., RS232 bus connection to a point-of-sale terminal or a host computer), or is transferred thereto in conventional manner from mass storage medium 27. The memory contains instruction for executing routines 19 on information that is stored in database 17 according to the present invention, as further described below. The memory also includes main menu functions 23 which allow the user to select and operate routines 19. Memory 18 further includes a buffer storage or interactive display control 25 for synchronously displaying lines of data bits on display device 12 in conventional manner. Permanent records and periodic reports of business item data may be plotted or printed out 31 under control of the CPU 11.

In accordance with the present invention, database 17 contains a number of files for gathering, storing, and manipulating data relating to demand for business items and the production and scheduling used to supply business items in response to such demand. Database 17 includes a day model file 30, an actual demand file 26, a sales day file 28, a past business demand curve file 16, a demand curve master file 14, a target master file 39, a production planning master file 40, a production planning frequency file 42, a production planning work file 51, and a calculation rules file 48, all as more specifically described later herein. Files in database 17 are accessed and modified under control of the CPU 11 in response to production planning routines 19 such as author functions and variables 13, past demand update 20, create projected targets 21, project near future demand 38, and monitor actual demand 63, as described later herein, for controlling the display on display device 12 of directions to a user for projecting quantities and schedules for business items to be produced 22 by the user during the prescribed time intervals throughout the day.

Figure 2:
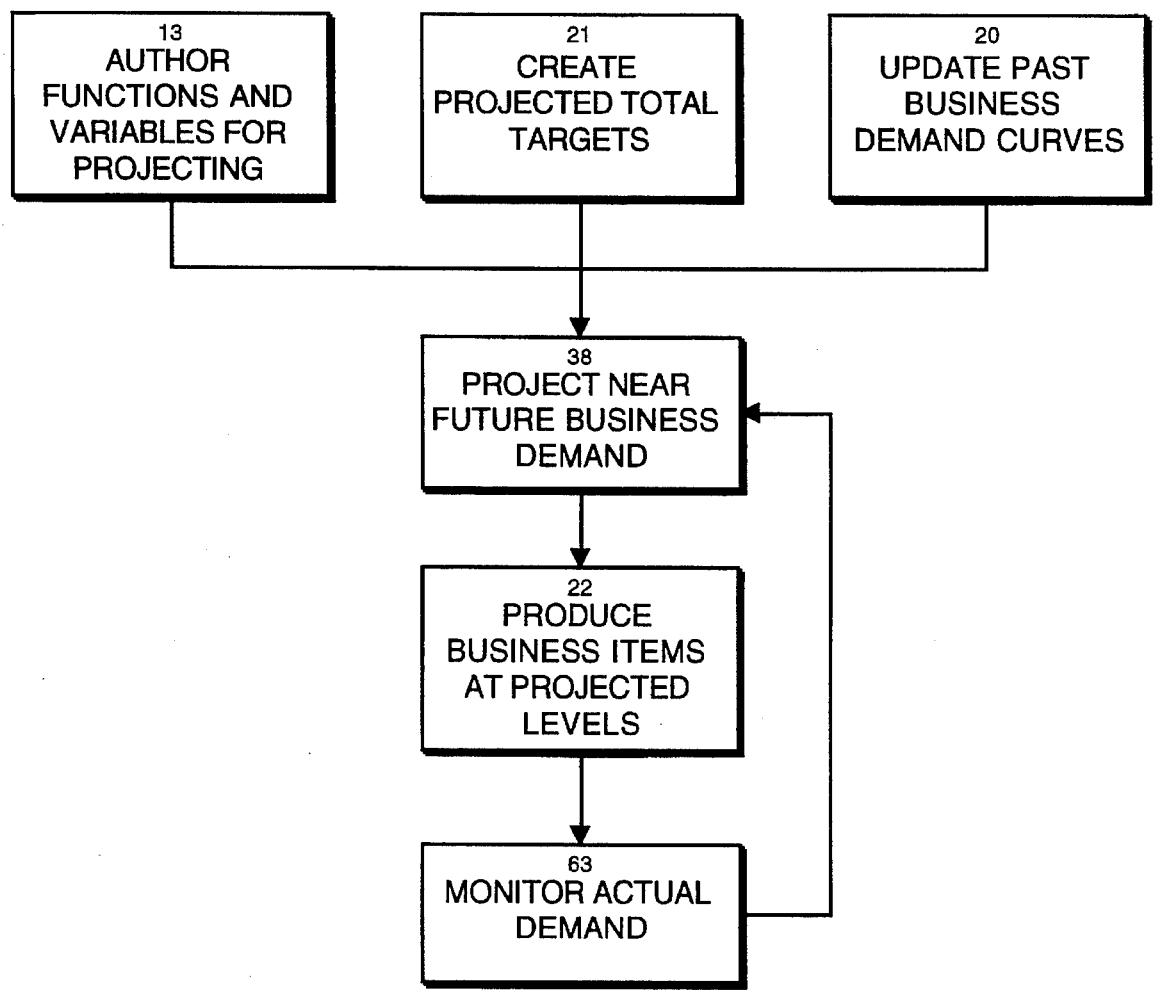
FIG. 2 is a flow chart of the system of the present invention showing, the process 20 of updating past business demand, authoring 13 functions for estimating demand, projecting 38 business demand, producing 22 business items, and monitoring 63 actual demand in order to re-estimate near future demand levels.
Figure 2B:
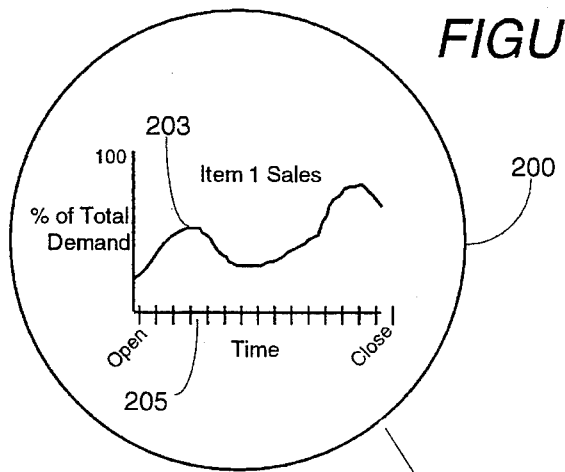
FIG. 2(a) is a representation of the past business demand curve file 16 containing a plurality of past business demand curves 200, stored according to their day model 213.

FIG. 2 shows a process for projecting near future business demand levels for a plurality of business items based on historical demand data, projected near future demand, and current demand levels. The process uses the concept of a "day model" to aggregate, store, access, and manipulate demand data for the purpose of projecting 38 near future demand levels.

A day model represents all the events that happen during a business day that effect the business demand for business items in terms of volume and distribution over time. A day model comprises a set of past business demand curves each representing the percentages of total demand in each of a plurality of time intervals for a business item between the start and end times of the business day. Each business day is associated with at least one day model, and a day model captures the variations in demand patterns which affect each business day in that model by weighting new demand data that is accumulated; this weighting is further described below with respect to FIGS. 3, 4, and 7.

Any type of day which is meaningful and recurring can serve as a day model for the business. The user can specify a day model for promotional events, like "Sidewalk Sale", or a "Mall Sale", or seasonal events, like "Day Before Christmas", "Day After Thanksgiving". Similarly the user can specify day models for business days having typical demand levels such as a "Normal Saturday", or a "Normal Tuesday". Certain day models, like a "Normal Tuesday", are designated as the default day models for each day of the week.

Figure 2A:
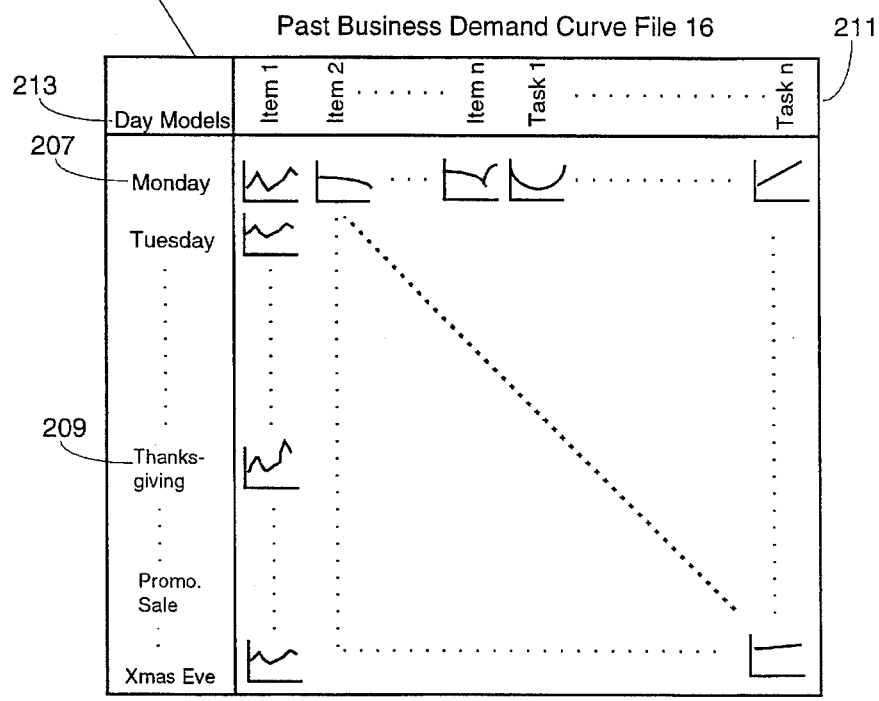

FIG. 2(a) shows a typical past business demand curve 200, here Item 1 Sales, as stored in past business demand curve file 16. Past business demand curve 200 shows the percent of total demand 203, in terms of sales dollars, over a number of time intervals 205 during the business day, between the opening and closing hours, for a "Monday" day model 207. Other past business demand curves in the Monday day model 207 contain the percentage demand levels for various business item or tasks as defined by the master demand curves 211, which are stored in demand curve master file 14. A day model 209 for Thanksgiving day here illustrates the different demand levels for Item 1 sales compared to the Monday day model 207. The past business demand curve file 16 can contain a plurality of day models 213, as defined by the user.

The day model uses historical demand data to create a projected target total demand level for each of the business items produced or scheduled in a business day. The projected target totals are based on the actual demand data for the business items, occurring with a selected day model, or set of day models. That is, the actual demand curves for a given item in various day models can be accumulated, for producing projected target totals. Thus if there is a day model for Normal Saturdays, and a day model for Promotional Sale, the actual demand curves for the business items in each of these day models can be accumulated to create the projected targets for a Saturday having a Promotional sale event.

The projected total demand targets are then distributed over the time intervals of the business day according to the percentage demand in each time interval as represented by the demand curves to determine the specific quantities, and scheduling of business items. These quantities or schedules are constantly compared with actual demand to revise the projected near future values, and the production or scheduling is then revised accordingly.

Accordingly, in FIG. 2, the user authors 13 a plurality of day models, functions and variables that describe the relationships between the business items, time intervals, and actual demand data. The user also authors variables describing production capacity and staffing requirements of the business location, along with other location specific or relevant production variables. The user then creates 21 total target levels for the various business items to be produced or scheduled during the day, using actual demand data as the basis for the projections.

The user updates 20 the past business demand curve 16 using recent actual demand data which has not yet been added to the past business demand curve file 16, and which is used by the system to project 38 near future demand. The system applies the authored functions and variables to the updated past business demand data to project 38 demand levels in a plurality of near future time intervals. In each of the near future time intervals, the user produces or effects 22 the plurality of business items for which the near future demand has been projected. The system continually monitors 63 actual current demand, and re-projects 38 near future demand accordingly, whereupon the user produces the business items according to the revised projected levels.

DAY MODEL, FUNCTION, AND VARIABLE AUTHORING

AUTHORING DATA FLOW

Figure 3:
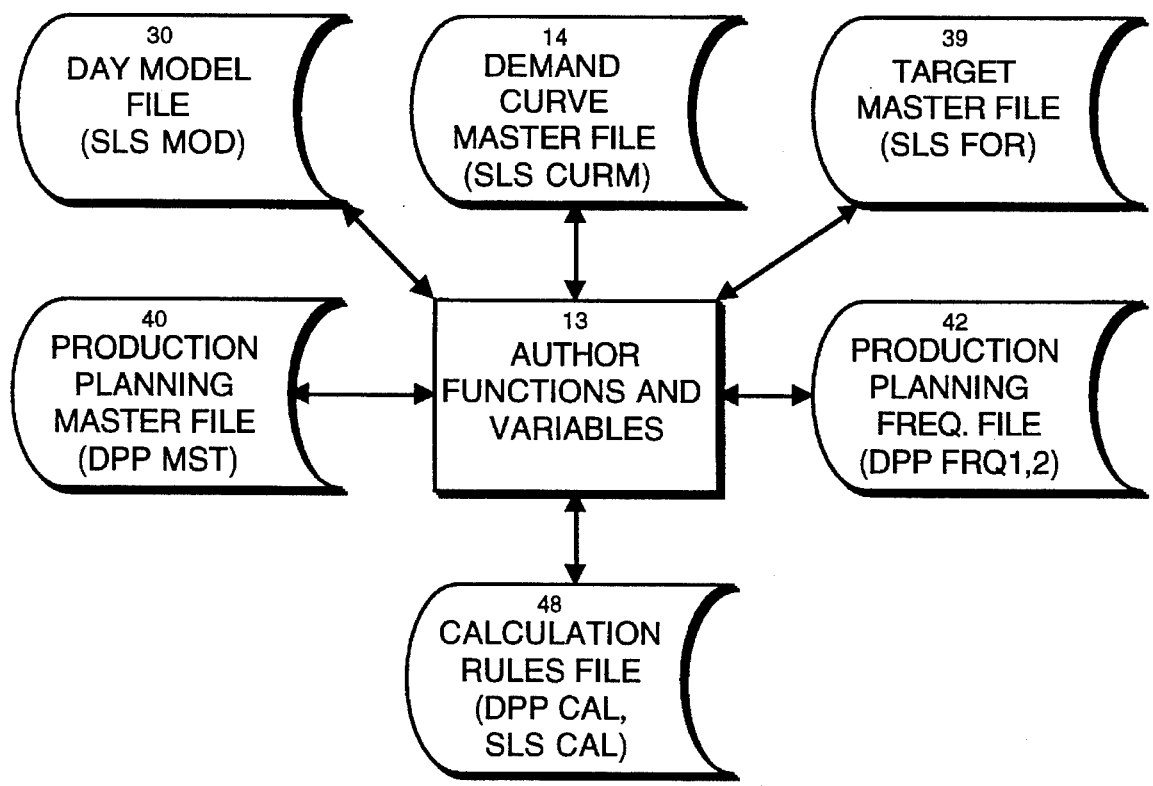
FIG. 3 is a data flow diagram showing the data used and stored during the authoring 13 of the various functions, variables and models used by the system.

Several of the files used in the systems are "authored" or specified by the user prior to, or during, operation of the system. In general, the user identifies the various day models and types of business items to be projected, and creates a set of formulas that can be associated between the day models and the business items to create projected demand levels. FIG. 3 illustrates the data flow in the process of authoring 13 these various models, functions, and variables. Authoring process 13 operates on day model file 30, demand curve master file 14, target master file 39, production planning master file 40, and production planning frequency file 42. The attached Appendix contains detailed descriptions of the file structures used in the authoring and other processes of the system.

Day model file 30 contains a day model descriptor, and opening and closing times associated with the model. The day model descriptor is used by the system to associate each business day with the relevant past business demand curves 200 and master demand curve definitions 211 used during that business day, and for updating the past business demand curves 200 for that day model. This update process is explained more fully below, with respect to FIG. 7.

The demand curve master file 14 defines each master demand curve definition 211 that will be tracked within each day model (See FIG. 2(a)). The master demand curve definitions 211 identify the various business items produced or used by the business for which demand is to be tracked in terms of total quantities, sales, or counts. There is generally a master demand curve definition 211 for each business item the production or scheduling of which is effected by variations in demand. For example, there could be master demand curve definition 211 for each business item in each department of a business in terms of total quantity, and total sales; there also could be master demand curve definitions 211 for department sales or quantities, product family sales or quantities, or counts of any kind, such as item counts, customer counts, receipts, or sales tickets. Each of the master demand curve definitions 211 is used in each day model since the set of master demand curve definitions 211 in demand curve master file 14 define all the relevant business items used or produced during a business day; this is illustrated in FIG. 2(a). Each master demand curve definition 211 is weighted with a decimal value which indicates the weight actual demand data is given relative to the curve data when the demand curve is updated 20.

Authoring process 13 also defines the functions in the calculation rules file 48 that are used to project 21 total demand targets and to project 38 near future demand on an interval basis. The calculations in calculation rules file 48 can associated with a given day model, or a given date, day of week, or other recurring interval, and are used to project and update the business demand for a given business day. The calculations rule file 48 is accessed by the calculation logic in the calculation rules process 46, when called by the various processes of the system. Calculation rules file 48 also contains information specific to the location, for use the various calculations.

Calculation rules file 48 contains a table of calculations identifiers, calculation formulas, and accompanying descriptions. Each calculation formula can include a number of predefined functions and operators which are applied to variables in the various data files to produce a projected future value for a desired variable. Predefined functions can include, for example, item sales for x number of weeks prior to the current date, or average total dollars sales during a given time interval. The formulas can contain Boolean operators, functions to adjust figures according to sales prices changes over time, or according to pre-specified values in lookup tables, commonly known in the art. In addition, the formulas can use lists of prices or costs, or other location specific information, such as production capacity and staffing levels, and the like. The projected future value can be either a interval by interval projection for a business item, for use in producing 22 the business item, or the total value for the item or class of items for the business day.

For example, the number of cookies to be produced on the current day can be set equal to the greater of the average number of similar cookies sold on that day of the week for three weeks prior to the current date or the number of similar cookies sold a year before the current date times a growth percentage. Similarly, total sales for the current day can be set equal to the percent increase or decrease in sales during previous four business weeks as compared to last year's similar time interval. Calculations that produce total values are used to project 21 targets for a given business day.

Authoring process 13 also defines the production planning master file 40 which defines the variety of business demands to be effected, such as which products to produce or tasks to perform, and associates each of these items with a defined curve by which the item is to be projected.

Authors process 13 also defines production planning frequency file 42 which defines the frequency with which various business items and tasks are undertaken, such as when to begin production of a given business item, and how much time is required to complete the production, or similarly, how often a given task is required, and how long such a task takes. These frequency values are used by the production planning master file 40 in conjunction with the calculation rules file 48 to produce a schedule for producing the business items in the future time intervals for which demand has been projected 21.

AUTHORING PROCESS

Figure 4:
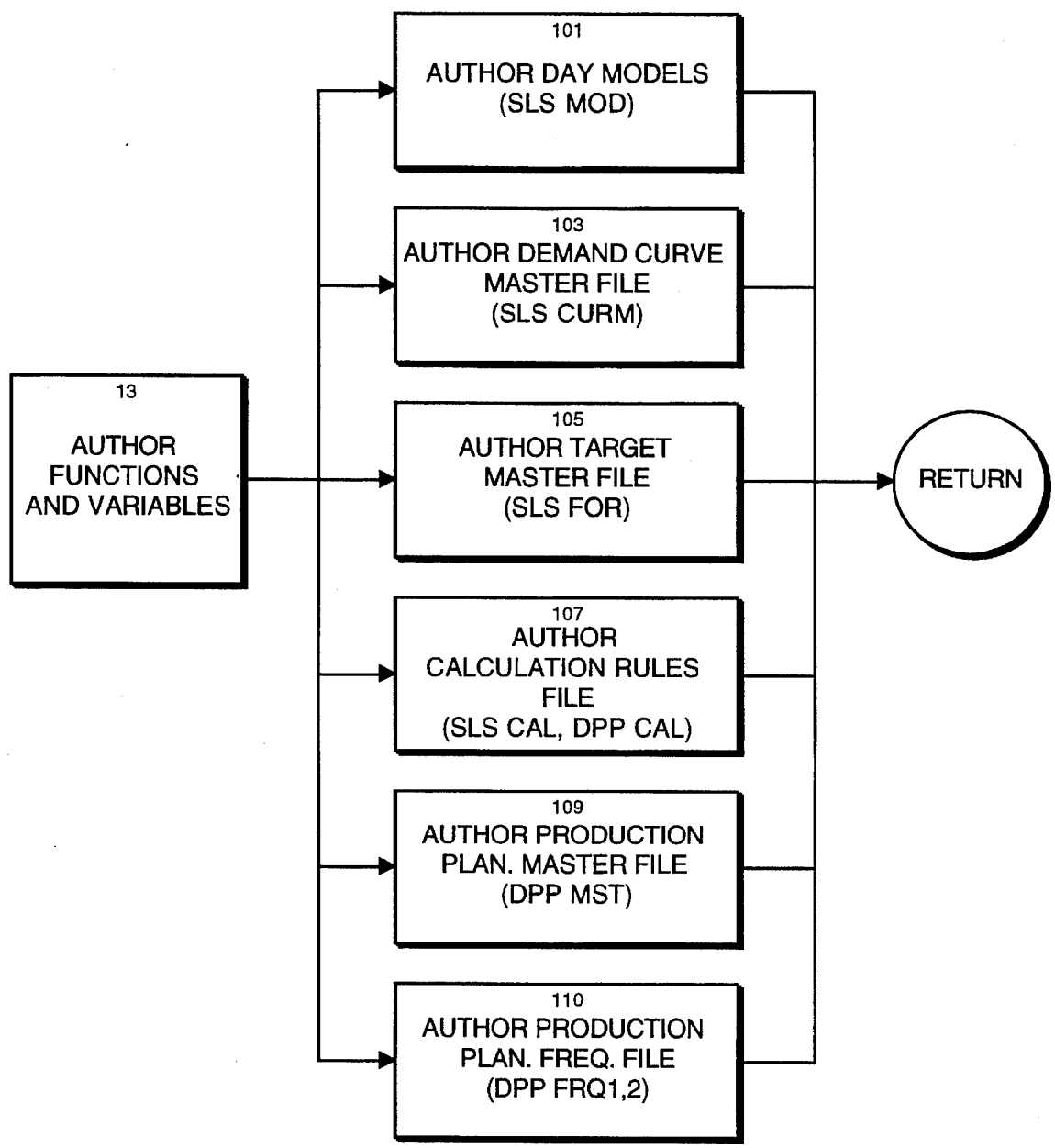
FIG. 4 is a flow chart of the process of authoring 13 the functions and variables used in projecting 38 business demand.

Referring now to FIG. 4, there is shown the process of authoring 13 the various functions, variables, and targets used to project 38 near future demand and determine production amounts for the business items. The user can author any or all of the functions and variables used by the system, and can change function or variable definitions as desired at any time.

The user authors 101 in the day models file 30 a set of day models to be used by the system as described above. The user specifies a descriptor for each desired day model, such as "Normal Monday" or any other useful descriptor, and sets the business operating hours for that model; these serve as the basis for scheduling any number of tasks or production activities to be effected during the business day. Also the user can designate a day model to be the default model for any particular day of the week.

The user authors 103 the demand curve master file 14 by creating a description of each curve, such as "Total Sales," "Item 1 Count," "Task 1" and attributing to each curve a weight percentage, and a curve type identifier. The weight percentage is used in the updating process 20 to weight the actual business demand applied to the past business demand curve file 16 for the designated item. For example if the weight for an Item 1 Count actual value is 30% then when the projected demand level for Item 1 is updated, 30% of the projected value will be based on the actual value, and 70% (1–0.30) will be based on past business demand data, which is determined by the appropriate curve for Item 1. That is, Item 1 Count curve=0.30 (Item 1 Actual Count)+0.70 (Item 1 Demand Data). The curve type identifier associates each curve with a data type for updating the curve. For example, the Item 1 Count curve would be a identified as a "Count" type curve, which are based on counts of items or situations, such as items sold, number of employees working, and the like. A "Sales" curve would be based on dollar sales amounts, and a "Check" type curve would be based on the number of sales tickets or receipts. Other curve type identifiers are possible, such that they link a curve with a data type found in the business operating environment.

The user further authors 105 the projected target master items in the target master file 39. This defines that various business items for which the users wants to project total targets and near future demand levels. Typically these projected targets will be the total values for various business items. The user specifies a desired type of projection, such as total sales, and designates an appropriate calculation from the calculation rules file 48 that will be used to calculate the projected value, as further explained below.

The user authors 107 the calculation rules file 48 by creating a description of the calculation desired, such as "Item 1 Sales," and an associated calculation number that serves as an identifier for the calculation. The user creates the calculation formula by conjoining any number of pre-defined functions, operators, and variables. The calculation rules process 46, when invoked by the various processes of the system, solves this equation and produces the desired value, such as the "Item 1 sales" for the desired item. The user repeats this process until she has authored the calculations for the business items and tasks to be projected.

The user authors 109 the production planning master file 40 by identifying production tasks and business items, and the frequency of the tasks, and selecting an appropriate calculation from the calculation rules file 48. The frequency value will indicate how often the task is to be effected, and in conjunction with the associated calculation will determine how much of the task is to be performed, such as the quantities of a particular item to be produced.

The user authors 110 production planning frequency file 42 by designating a task identifier, a start and end time, or duration, and a frequency value for how often the task is to be performed during the business day.

CREATION OF PROJECTED TARGETS

PROJECTION DATA FLOW

Figure 5:
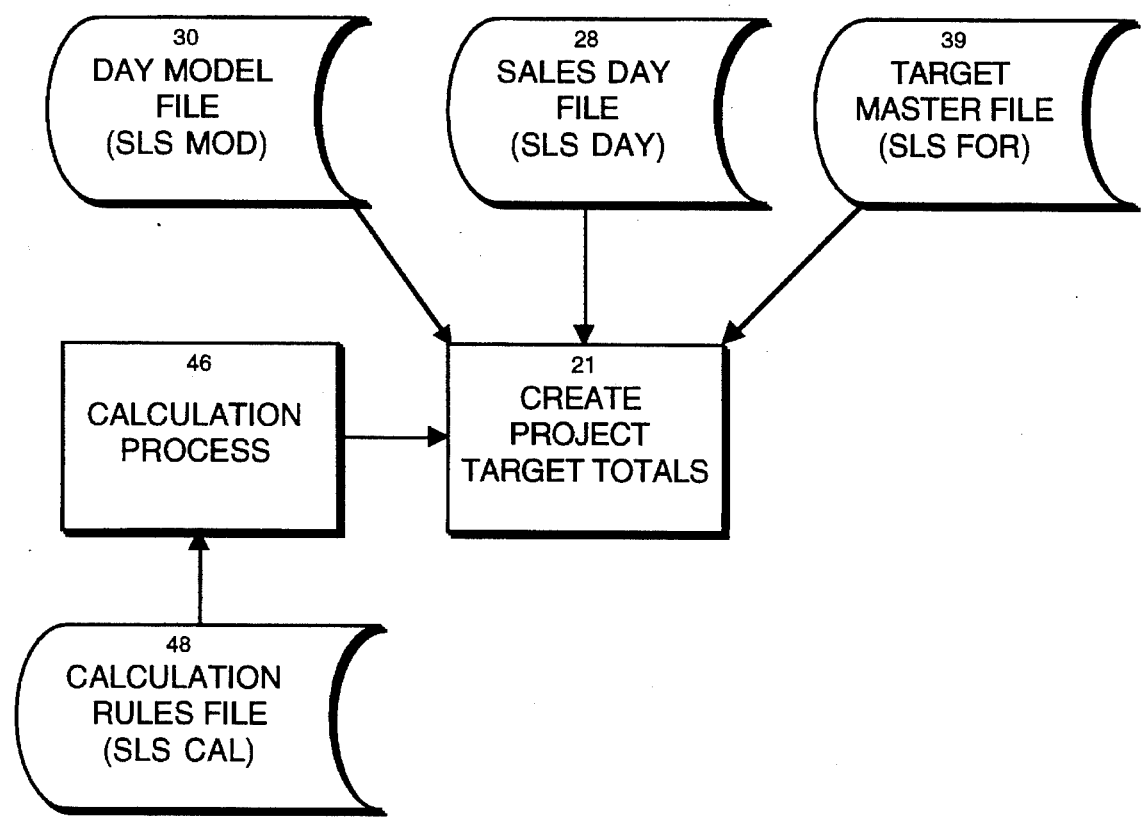
FIG. 5 is a data flow diagram of the data used and stored during the process of projecting 21 target totals.

FIG. 5 shows the data flow during the process of creating the projected target totals. Projection process 21 uses data from the target master file 39, sales day file 28, and in conjunction with the appropriate calculations in calculation rules file 48, creates projected target totals which are stored in the sales day file 28.

The sales day file 28 contains the day model indicator of the recent past actual data to determine which past business demand curve 16 to update, and further contains the total demand values for each business day for each of the business items specified in the target master file 39. The target master file 39 and calculation rules file 48 are as described above.

PROJECTION PROCESS

Figure 6:
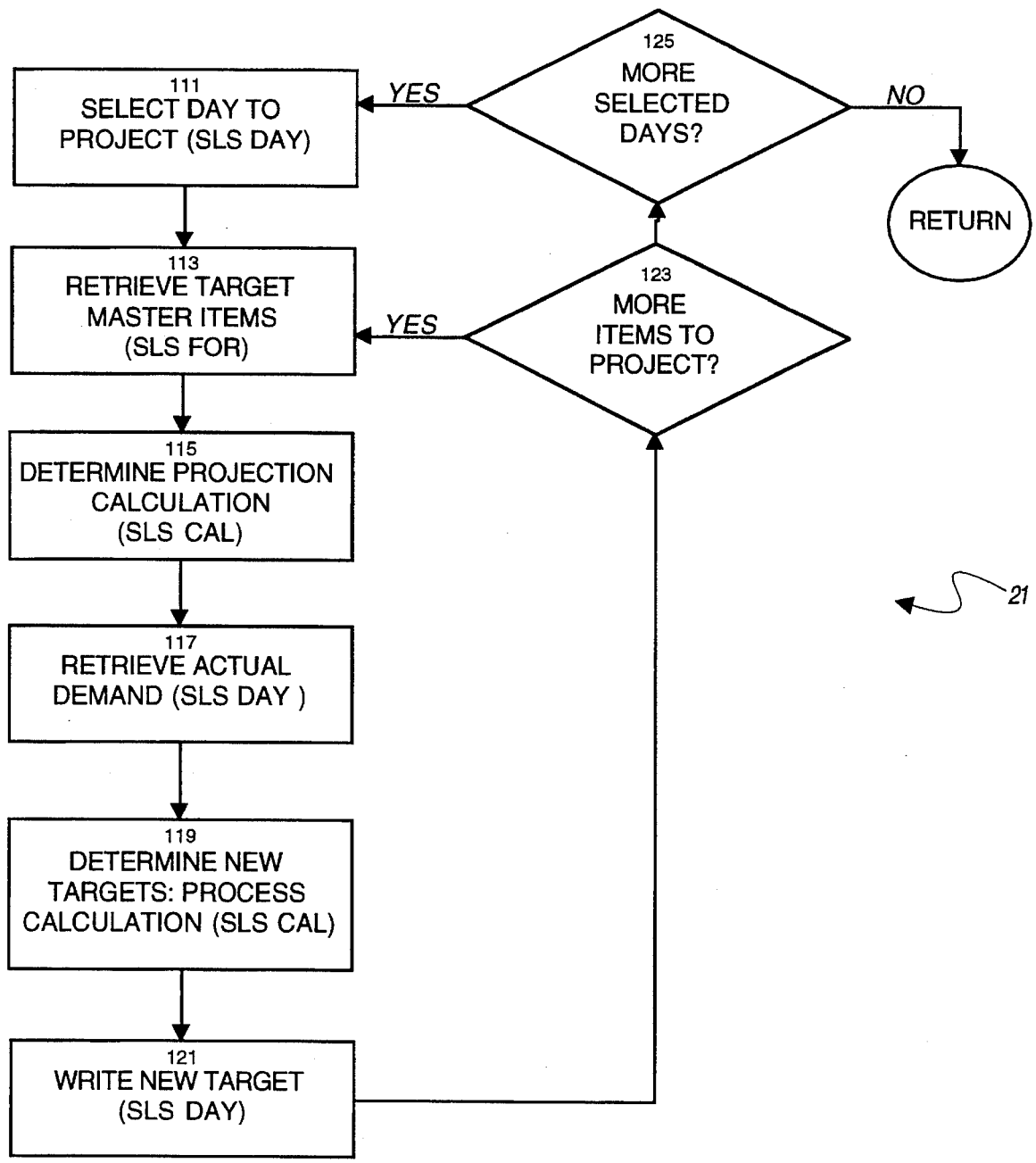
FIG. 6 is a flow chart of projecting 21 total targets for demand levels.

FIG. 6 shows the process 21 of creating the projected target totals for the various business items to be produced or scheduled during a business day. The user selects 111 a starting date for the projected interval and a number of days to be projected, and the day model is retrieved from the sales day file 28. This allows the system to identify the appropriate historical data contained in the sales day file 28 to use for projecting total demand for the business day. The desired business items to project for the business day are retrieved 113 from the target master file 39; for example the user would specify total sales and total customers for the business day as the desired projected values. The appropriate projection calculation is specified 115 from the calculation rules file 48. Continuing with this example, projected total sales could be set equal to last weeks' average sales increased by ten percent. The appropriate actual past data, as indicated by the calculation is then retrieved 117 by the calculation process 46 from the sales day file 28, and the projected target total is calculated 119. This projected total value is then written 121 back to sales day file 28 as the projected total value for the day. This loop from steps 111 to 121 is continued for all the selected business items 123, and the number of days to be projected 125.

UPDATING PAST BUSINESS DEMAND

UPDATE DATA FLOW

Figure 7:
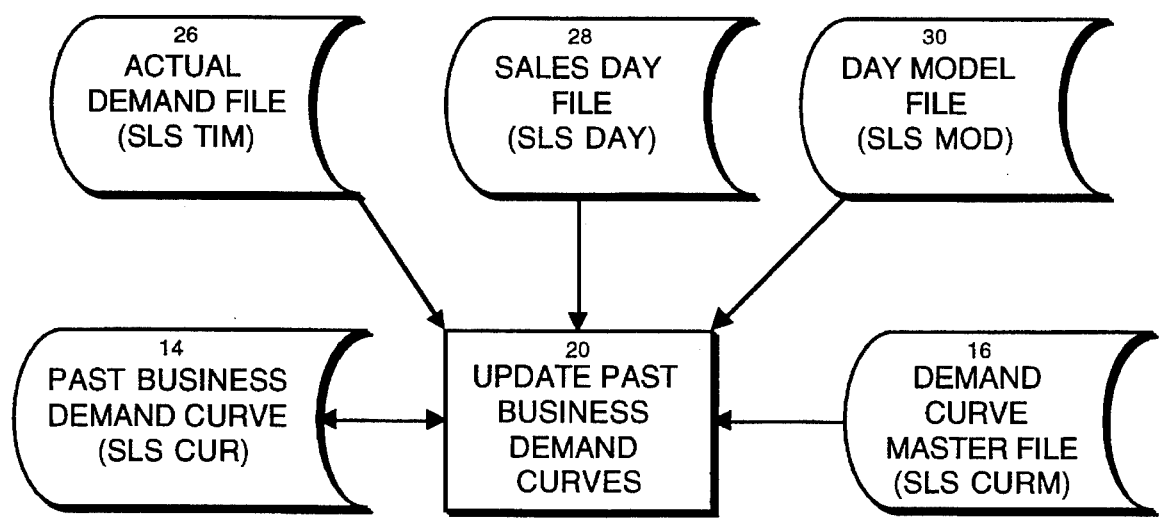
FIG. 7 is a data flow diagram showing the data used and stored during the update 20 of past business demand.

Referring now to FIG. 7, there is shown a data-flow diagram of the process 20 that operates to update past business demand data to database 17 that is used to project business demand in future intervals. (The process 20 of updating the business demand is described in FIG. 8.) The data in past business demand curve 16 is updated by process 20 using actual demand file 26. Actual demand file 26 contains past actual data by time interval accumulated during the day for total sales, department sales, individual business item sales, or counts of any kind, as described above. The data in actual demand file 26 can come from point of sale terminals which store and accumulate for each transaction the identity and quantity of the purchased items. This data can then be uploaded over network 29 host computer for centralized storage and retrieval. The remaining files are as previously explained.

UPDATE PROCESS

Figure 8:
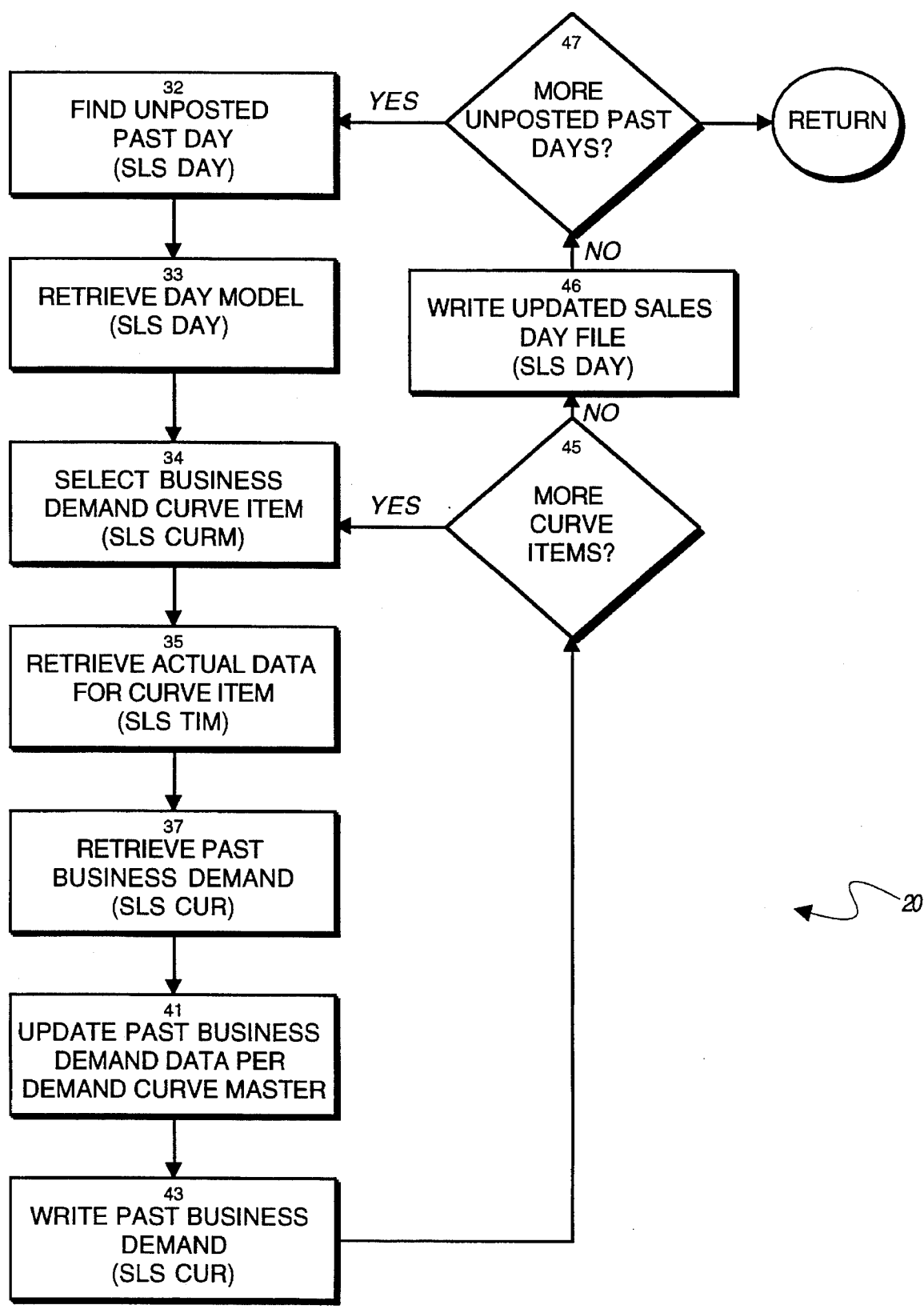
FIG. 8 is a flow chart of the updating 20 of recent actual demand to the past business demand curve.

Referring now to FIG. 8, there is shown a flow chart of the past business demand updating routine 20 for updating the past business demand curves 200 in past business demand curve file 16 with actual demand data from the actual business demand file 28. An unposted past demand day is determined by reading 32 the sales day file 28 and finding an unposted day. The day model is retrieved 33 from the sales day file 28. A loop 34 is initiated for each past business demand curve 200, or item, which is indicated in the demand curve master file 14. The curve type identifier in the demand-curve master file 14 specifies which recent-past actual data should be used to update the curve, and the weight percentage with which the actual data should be applied to the past business demand curve 200. Recent past actual data is retrieved 35 from the actual demand file 26. The past business demand curve 200 is retrieved 37, and the recent past actual data is applied 41 to the past business demand curve 200 in accordance with the weighted percentage from the demand-curve master file 14. As discussed above, if, for example, the weight for an Item 1 Count actual value is 30%, then when the projected demand level for Item 1 is updated, 30% of the projected value will be based on the actual value, and 70% (1–0.30) will be based on past business demand data. The updated past business demand curve 200 is rewritten 43 to the past business demand curve file 16. For each 45 demand-curve business item in the demand curve master file 14, steps 35 through 43 are repeated. The day is marked as posted 46, and for each unposted past demand day 47, steps 32 through 46 are repeated 47.

PROJECTION OF INTERVAL BUSINESS DEMAND

PROJECTION DATA FLOW

Figure 9:
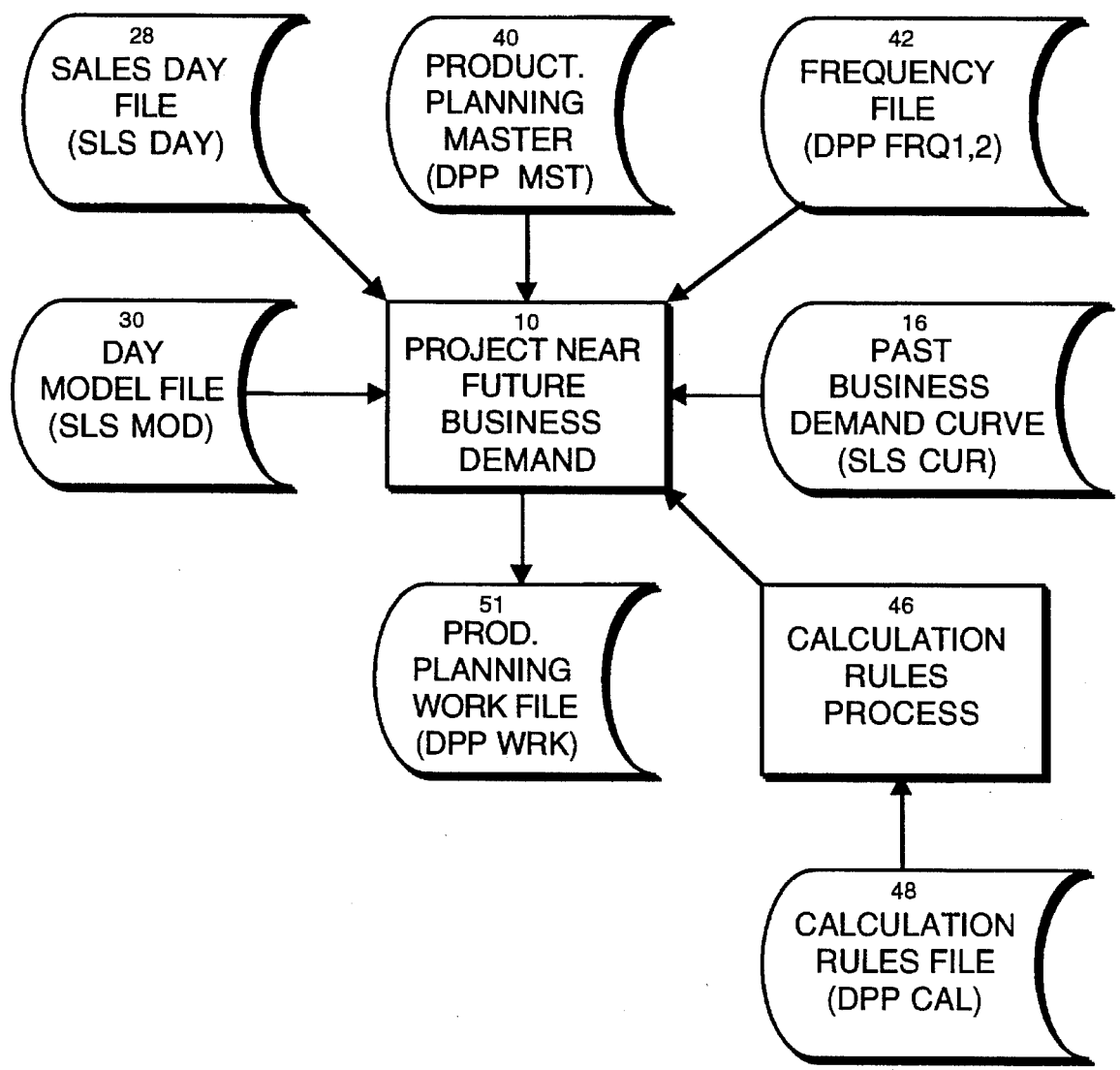
FIG. 9 is a data flow diagram showing the data used and stored during the projection 38 of near future business demand.

FIG. 9 illustrates the flow of data in the process 38 of projecting business demand in future time intervals. (The process 38 of projecting the business demand is described with reference to FIG. 10.) In FIG. 9 the past business demand curve file 16, sales day file 28, production planning master file 40, and production planning frequency file 42 all supply data for process 38. The sales day file 28 supplies the day model indicator of the current or near future day to determine which past business demand curve to use when projecting business demand, and the projected target totals for the various business items. Past business demand curve file 16 provides percentage curve data for each of the business items for which demand is to be projected; these curves can be for sales figures, item counts, or customer numbers, and are stored as percentages of total demand in each of a plurality of time intervals. The production planning master file 40 defines each business item or task that must be planned and information as to how and when it should be planned. It also indicates which past business demand curve is used with the production planning master file when projecting a value for the item for given time interval. The production planning frequency file 42 defines the frequency and what time of day an item should be produced. The production planning work file 51 is used to store projected business demand in each time interval, revised business demand, and projected start and completion times for business tasks, as shown in the file descriptions in the attached Appendix.

PROJECTION PROCESS

Figure 10:
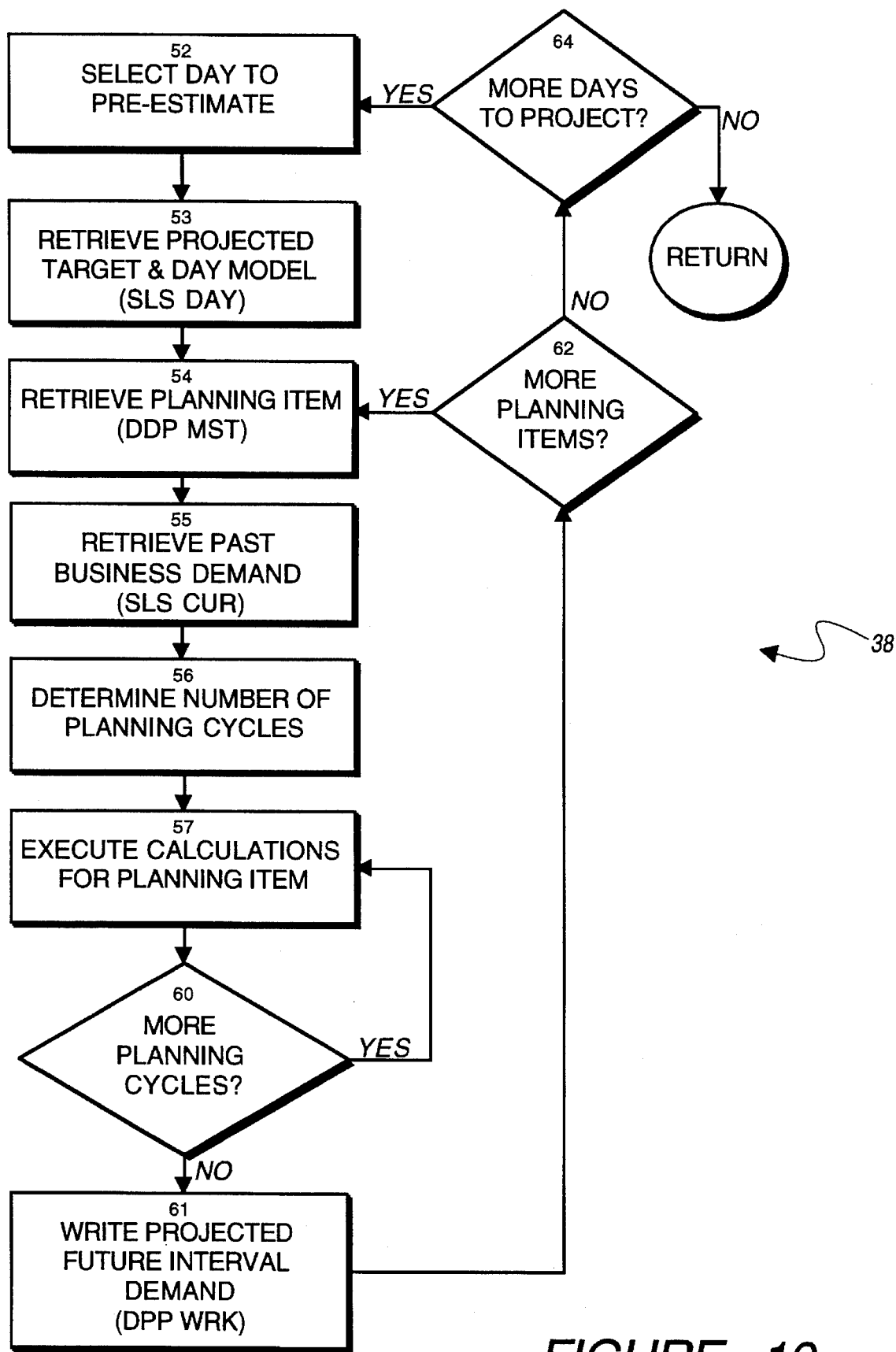
FIG. 10 is a flow chart projecting 38 near future interval business demand.

Referring now to FIG. 10, there is shown a flow chart illustrating the process 38 used to project the near-future business demands. The first day to project is selected 52, and the projected total demand, such as total sales, and the day model for the day are retrieved 53 from the sales day file 28. The first production planning item is retrieved 54 from the production planning master file 40. The past business demand curve 200 for the planning item is retrieved 55, and the number of planning cycles is determined 56 from the production planning master file 40 and production planning frequency file 42. For each planning cycle the calculations in calculation rules file 48 for the planning item are executed 57 by accessing rules calculation process 46, which applies the calculations to the past business demand curve 200 and projected target totals to determine the projected business demand for the business item in each planning cycle.

The rules calculations process 46 accumulates, for the duration of the planning cycle, the past business demand curve 200 from the past business demand curve file 16 for the corresponding duration of the planning cycle, and represents it as a percent of past total demand. This percent will then be applied against the current daily projected total demand to generate the near-future business demand for the planning cycle. Once this calculation has been performed, then all other projection calculations will be applied. Other projection calculations may include, for example, location-specific values (e.g., limited by the number of ovens, etc.), look-up table values, and embedded constants and calculations.

As an example, assume the projected target for total sales for a business day were $1000. The user wishes determine the number of item X's to produce between opening and noon, which is half the business day. The process accumulates for this time interval the total of interval percentages in the past business demand curve for item X, which here could be 35% of the day's total sales (an will always be less than 100%). Accordingly, the system determines the there were $350 (35% of $1000) in item X sales during this time interval. Dividing $350 by the price of item X yields the quantity of item X to be produced between opening and noon. This quantity could be further projected into smaller time intervals between opening and noon, according to the time required to produce item X.

If there are more planning cycles 60 then calculation process 46 is executed 57 again. Once all cycles for a planning items are calculated, the projected business demand in each selected future interval is written 61 to the production planning work file 51. If there are more planning items 62, then for each planning item, steps 54 through 61 are repeated. If there are more planning days 64 to project 38 (since the user can choose to project 38 any number of days at a time), then additional days are selected 52 and the above process repeated. Once projecting 38 is complete for all products, control is returned to producing 22 the projected business items and monitoring 63 (FIG. 2) the actual demand, which is illustrated in the flow chart of FIG. 11. The user refers to production planning work file 51 as the production schedule for the near future, and produces 22 the specified quantities of the selected business items.

ACTUAL DEMAND MONITORING PROCESS

Figure 11:
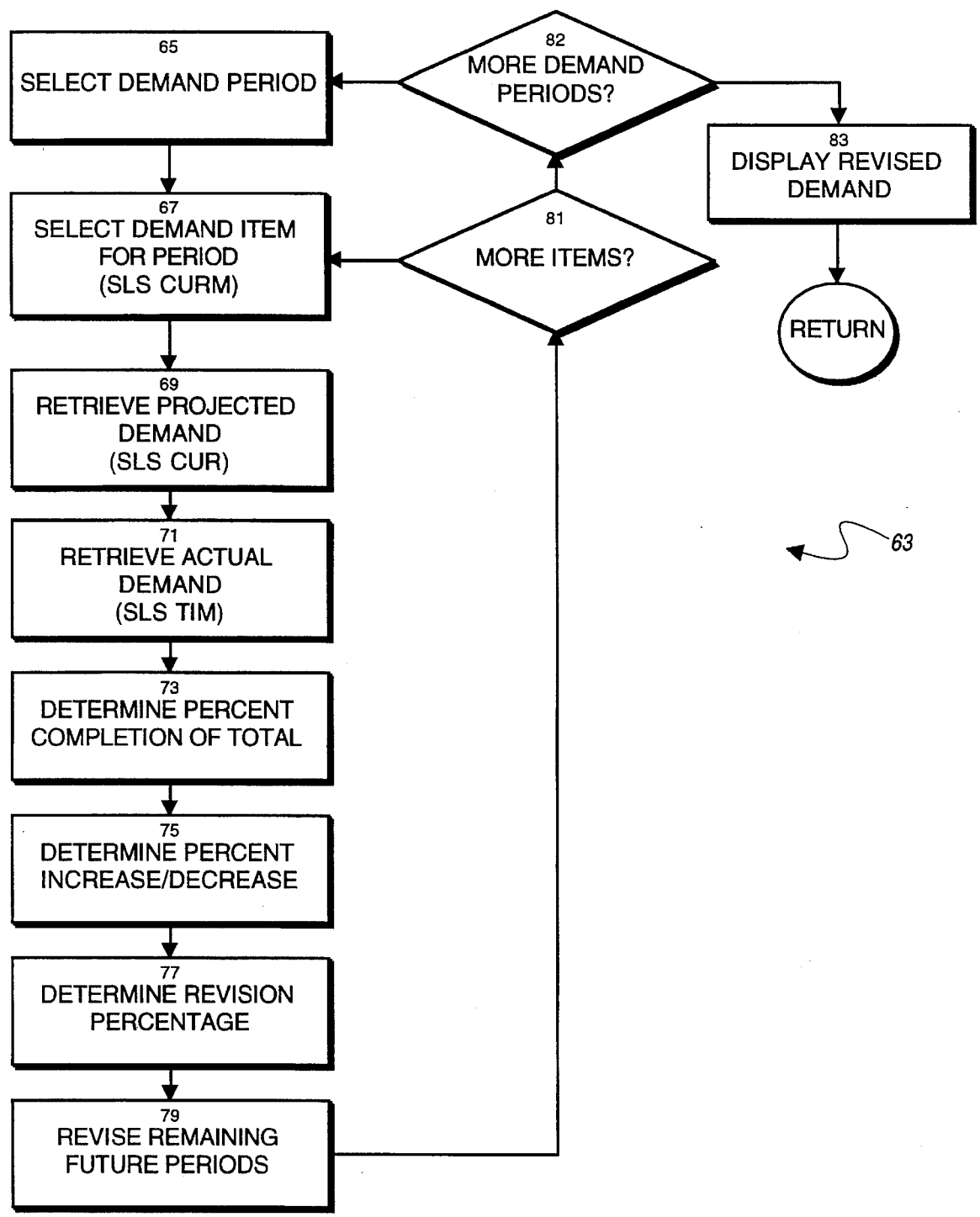
FIG. 11 is a flow chart of the monitoring 63 and revision of near-future period business demand based on recent past periods of actual demand compared with the project of the same recent past periods.

Referring now to FIG. 11, there is shown a flow chart illustrating the process 63 of monitoring actual demand against projected demand and revising near future-intervals to reflect detected variations. The first demand interval is determined 65 for monitoring by checking the time of day, as only the demand in past time intervals can be monitored, and a business item is selected 67 for monitoring. The projected demand for the business item is retrieved 69 from the sales day file 28 and applied to the past business demand curve file 16. The actual demand for this business item is retrieved 71 from the actual demand file 26. The percent complete of total demand for the recent past intervals is calculated 73 through the current interval. This can be done by dividing the total actual item demand through the monitored interval by the projected total item amount for the business day. The percent differential for the business item between recent past actual demand and corresponding recent past projected demand is calculated 75 through the current interval. The particular revision logic 79 to execute is determined 77 based upon the percent differential of the demand for business item determined in step 75. There are upper and lower threshold limits and a growth factor defined in a location specific file. If the percent differential of any business demand exceeds the upper limit, then all remaining demand intervals will be revised up by the same percentage. If the percent differential of any business demand is between zero and the upper threshold, then no revision is performed. If the percent differential of any business demand is between zero and the lower threshold, then the positive value of the percent differential is multiplied by the percentage of the remaining demand for the business, as determined by the past business demand curve 16. This yields a value which is then distributed over the remaining demand intervals of the day in proportion to the projected demand for the remaining intervals, to increase the projected demand. If the percent differential is below the lower threshold, then all remaining demand intervals will be revised down the same percentage and then revised back up by the growth factor. See Table 1:

TABLE 1

| | Negative Percent Change | | Positive Percent Change | |
| --- | --- | --- | --- | --- |
| | Exceeds Lower Threshold | Between Lower Threshold and Zero | Between Zero and Upper Threshold | Exceeds Upper Threshold |
| Revision Logic 79 | Revise Down by Actual % Change, Revise Up by Growth Factor | Revise by - (Actual %) * Remaining % Demand | No Revision | Revise by Actual % Change |

If there are more business items to monitor 81 then steps 67 through 79 are repeated for each business item that occurs within this demand interval. If there are more demand intervals to monitor 82 then for each remaining demand interval, steps 65 through 80 are repeated. The revised projected demand for the business items is displayed 83. The revised projected demand is then used by the production planning master file 40 to determine the revised schedule and quantities of business items or tasks to produce 22.

APPENDIX

SLSMOD.ATH - Sales Day Model File

File Description:

This file stores the sales day model information for the SALES FORECASTING module. These fields are updated by the SLS.EXE FUNC=5 and FUNC=6 functions.

Field Format:

| POSITION | LENGTH | KEY   | DESCRIPTION       |
|----------|--------|-------|-------------------|
| 1        | 3      | 0a 1a | Department number |
| 4        | 2      | 0b    | Day model         |
| 6        | 2      | 1b    | Display key       |
| 8        | 25     |       | Description       |
| 33       | 4      |       | Open time         |
| 37       | 4      |       | Close time        |
| 41       | 10     |       | Filler            |

File Stats for SLSMOD.ATH

Record Length = 50
Variable Records = No
Number of Keys = 2
Page Size = 1024

| Key | Position | Length | Duplicates | Modifiable | Type   |
|-----|----------|--------|------------|------------|--------|
| 0   | 1        | 3      | No         | Yes        | String |
| 0   | 4        | 2      | No         | Yes        | String |
| 1   | 1        | 3      | Yes        | Yes        | String |
| 1   | 6        | 2      | Yes        | Yes        | String |

SLSDAY.DDF - Sales Day File

File Description:

This file contains detailed sales information about each sales day. This is the general stage area for multiple programs in the SALES FORECASTING module. Status information is stored on each day to show if a day was updated correctly. These fields are updated with the SLS.EXE FUNC=7 function. This is a binary file; see page 1 in this section for the table used to determine the byte size of fields labeled float, double, long, and integer.

Field Format:

| POSITION | LENGTH | KEY | DESCRIPTION |
|---|---|---|---|
| 1 | 3 | 0a 1b 2b | Department number (0 - all) |
| 4 | 6 | 0b 1d 2a | Date |
| 10 | 2 | 1a | Day model |
| 12 | 3 | | Promotion type |
| 15 | 10 | | Filler |
| 25 | 1 | 1c | Completed flag |
| | | |     0 - Unprojected |
| | | |     1 - Updated |
| | | |     2 - Incomplete |
| 26 | 1 | | Summarize flag |
| | | |     0 - Not summarized |
| | | |     1 - Summarized |
| 27 | 1 | | Cash balance flag |
| | | |     0-Not balanced |
| | | |     1-Balanced |
| 28 | 1 | | Weather flag |
| 29 | 9 | | Filler |
| 38 | 6 | | Summary date |
| 44 | 4 | | Summary time (end of fixed portion) |
| 48 | 2 integer | | Number of missed sales readings |
| 50 | 8 double | | Modified projected sales |
| 58 | 8 double | | Financial projected sales |
| 66 | double | | Original projected sales |
| | double | | Actual sales |
| | double | | Last year actual sales |
| | long | | Modified projected check |
| | long | | Modified projected count |
| | long | | Original projected check |
| | long | | Original projected count |
| | long | | Actual count |
| | long | | Actual check |
| | long | | Last year check |
| | long | | Last year count |
| | float | | Projected cost of goods |

| | |
|---|---|
| float | Actual cost of goods |
| double | Area 1 - Total receipts |
| double | Area 2 - Adjustments to Cash |
| double | Area 3 - Total cash |
| double | Area 4 - Net/gross sales |
| double | Area 5 - Prepaid sales/Liabilities |
| double | Cash Sheet Field 1 |
| double | Cash Sheet Field 2 |
| double | Cash Sheet Field 3 |
| double | Cash Sheet Field 4 |
| double | Cash Sheet Field 5 |
| double | Cash Sheet Field 6 |
| double | Cash Sheet Field 7 |
| double | Cash Sheet Field 8 |
| double | Cash Sheet Field 9 |
| double | Over/short cash |
| double | Filler |
| float | Modified projected staff hours |
| float | Modified projected manager hours |
| float | Modified projected asst manager hours |
| float | Modified projected training hours |
| float | Modified projected cost/staff hour |
| float | Filler |
| float | Actual staff hours |
| float | Actual manager hours |
| float | Actual asst manager hours |
| float | Actual 1st training hours |
| float | Actual 2nd training hours |
| float | Actual cost/staff hour |
| float | Overtime hours (staff) |
| float | Last year staff hours |
| float | Original projected staff hours |
| float | Original projected manager hours |
| float | Original projected asst manager hours |
| float | Original projected training hours |
| float | Original projected cost/staff hour |
| float | Filler |
| float | Optimal projected staff hours |
| float | Optimal projected manager hours |
| float | Optimal projected asst manager hours |
| float | Optimal projected training hours |
| float | Optimal projected cost/staff hour |
| float | Filler |
| float | Host projected staff hours |

File Stats for SLSDAY.DDF

Record Length = 47
Variable Records = Yes
Free Space Threshold = 5%
Number of Keys = 3
Page Size = 1024

| Key | Position | Length | Duplicates | Modifiable | Type |
|---|---|---|---|---|---|
| 0 | 1 | 3 | No | Yes | String |
| 0 | 4 | 6 | No | Yes | String |
| 1 | 10 | 2 | No | Yes | String |
| 1 | 1 | 3 | No | Yes | String |
| 1 | 25 | 1 | No | Yes | String |
| 1 | 4 | 6 | No | Yes | String |
| 2 | 4 | 6 | Yes | Yes | String |
| 2 | 1 | 3 | Yes | Yes | String |

SLSTIM.DDF - Sales Product Period Sales File

File Description:

This file stores sales amounts accumulated by period. This is a binary file. See page 1 in this section for the byte size of fields labeled float, double, long, and integer. Variable length records begin at column 32. This file can be updated by point-of-sale systems or by the SLS.EXE FUNC=8 function in the SALES FORECASTING module.

Field Format:

| POSITION | LENGTH | KEY | DESCRIPTION |
|---|---|---|---|
| 1 | 6 | 0a | Date |
| 7 | 3 | 0b | Department number (0 - all) |
| 10 | 1 | 0c | Production group type (DPPCUR) |
| | | | 0 - Sales |
| | | | 1 - Check count |
| | | | 2 - Customer count |
| | | | 3 to 9 - Reserved |
| 11 | 5 | 0d | Production key (PLU# or DPT#) |
| 16 | 17 | | Filler (end fixed portion) |
| 33 | double | | Total amount |
| | float * 192 | | Actual amounts |

File Stats for SLSTIM.DDF

Record Length = 32
Variable Records = Yes
Free Space Threshold = 5%
Number of Keys = 1
Page Size = 1024

| Key | Position | Length | Duplicates | Modifiable | Type |
|---|---|---|---|---|---|
| 0 | 1 | 6 | No | Yes | String |
| 0 | 7 | 3 | No | Yes | String |
| 0 | 10 | 1 | No | Yes | String |
| 0 | 11 | 5 | No | Yes | String |

SLSCUR.DDF - Sales Curve File

File Description:

This file contains the sales curve information. Fixed length is 18 characters. These fields can be updated using the SLSUPT.EXE program. This is a binary file; refer to page 1 of the Sales Data Files section for the table used to determine the byte size of fields labeled float, double, long, and integer.

Field Format:

| POSITION | LENGTH | KEY | DESCRIPTION |
|---|---|---|---|
| 1 | 2 | 0a | Day Model |
| 3 | 3 | 0b | Department number (0 - all) |
| 6 | 1 | 0c | Production Group type (DPPCUR) |
|   |   |   |     0 - Sales |
|   |   |   |     1 - Check |
|   |   |   |     2 - Count |
|   |   |   |     3 to 9 - Reserved |
| 7 | 5 | 0d | Production Key |
|   |   |   |     (PLU#, DPT#, inventory#, or other#) |
| 12 | 1 |   | Curve Flag |
|   |   |   |     0 - Sales |
|   |   |   |     1 - Counts |
| 13 | 6 |   | Filler (end fixed portion) |
| 19 | double |   | Total value |
|   | double |   | Total percentage |
|   | float * 192 |   | Curve values |

File Stats for SLSCUR.DDF

Record Length = 18
Variable Records = Yes
Free Space Threshold = 5%
Number of Keys = 1
Page Size = 1024

| Key | Position | Length | Duplicates | Modifiable | Type |
|---|---|---|---|---|---|
| 0 | 1 | 2 | No | Yes | String |
| 0 | 3 | 3 | No | Yes | String |
| 0 | 6 | 1 | No | Yes | String |
| 0 | 7 | 5 | No | Yes | String |

SLSCURM.ATH - Sales Curve Master File

File Description:

This file contains the authored description of the curve types in the SALES FORECASTING module. These fields can be updated using SLS.EXE FUNC=2.

Field Format:

| POSITION | LENGTH | KEY | DESCRIPTION |
|---|---|---|---|
| 1 | 3 | 1b | Sequence number |
| 4 | 3 | 1a 0a | Department number (0 - all) |
| 7 | 1 | 0b | Group |
| 8 | 5 | 0c | Production key |
| 13 | 25 | | Description (also used as Promotion Master file) |
| 38 | 1 | | Record type<br>A - Sales curve |
| 39 | 2 | | Weight (percentage, used with promotion type) |
| 41 | 5 | | Unit of measure |
| 46 | 1 | | Sales flag (get sales for this item) |
| 47 | 1 | | Total flag (total curve values). |
| 48 | 3 | | Filler |

File Stats for SLSCURM.ATH

Record Length = 50
Variable Records = No
Number of Keys = 2
Page Size = 1024

| Key | Position | Length | Duplicates | Modifiable | Type |
|---|---|---|---|---|---|
| 0 | 4 | 3 | No | Yes | String |
| 0 | 7 | 1 | No | Yes | String |
| 0 | 8 | 5 | No | Yes | String |
| 1 | 4 | 3 | No | Yes | String |
| 1 | 1 | 3 | No | Yes | String |

SLSFOR.ATH - Sales Forecast File

File Description:

This file stores calculation types for projections in the SALES FORECASTING module. The records in this file are authored by the SLS.EXE FUNC=20 function.

Field Format:

| POSITION | LENGTH | KEY | DESCRIPTION |
|---|---|---|---|
| 1 | 3 | 0a | Department number |
| 4 | 3 | 0b | Sequence number |
| 7 | 2 | | Type |
| 9 | 3 | | Calculation number |
| 12 | 19 | | Filler |

File Stats for SLSFOR.ATH

Record Length = 30
    Compressed Records = No
    Variable Records = No
    Number of Keys = 1
    Page Size = 1024

| Key | Position | Length | Duplicates | Modifiable | Type |
|---|---|---|---|---|---|
| 0 | 1 | 3 | No | No | String |
| 0 | 4 | 3 | No | No | String |

DPPMST.ATH - Production Planner Master File

File Description:

This file logs all plans by item number. The curves by which the item is to be planned are also given. If a record is a non-frequency, the daily and period rules are included in the master file. All frequency type records will use the DPPFRQ1.ATH and DPPFRQ2.ATH files. Any items that determine the result of the current record must be planned ahead of the specific record. This file is authored in the PRODUCTION PLANNER maintenance program, DPPMNT.EXE.

Field Format:

| POSITION | LENGTH | KEY | DESCRIPTION |
|---|---|---|---|
| 1 | 3 | 0a 1a | Department number (for particular planner) |
| 4 | 2 | 0b 1b | Group number |
| 6 | 4 | 0c | Planning item number (Does not have to be sequential but program will order sequentially.) |
| 10 | 2 | 0d 1c | Display group key |
| 12 | 3 | 2a | Department number reference key |
| 15 | 1 | 2b | Production group type (0 - 9) (DPPCUR)<br>0 - Sales<br>1 - Check count<br>2 - Customer count<br>3 to 9 - Reserved |
| 16 | 5 | 2c | PLU number, dept number, or sales key (DPPCUR) |
| 21 | 8 | | Description 1 |
| 29 | 17 | | Description 2 |
| 46 | 1 | | Day/period/frequency (D,P,F) |
| 47 | 1 | | Day count |
| 48 | 1 | | Sales curve relative positioning type<br>O - Relative to open<br>C - Relative to close<br>N - Relative to noon |
| 49 | 8 | | Offset in periods (+-)<br>(calculation record)<br>(sales curve positioning) |
| 57 | 8 | | Planning window<br>(calculation record)<br>(sales curve positioning) |
| 65 | 1 | | Production display flag<br>(Item is displayed on quantity.) |
| 66 | 1 | | Work positioning relative type<br>O - Relative to open<br>C - Relative to close<br>N - Relative to noon |

| | | |
|---|---|---|
| 67 | 8 | Offset (to work positioning) |
| 75 | 8 | Prep time, duration (calculation record) (work positioning) |
| 83 | 10 | Comments |
| 93 | 4 | Unit description |
| 97 | 8 | Calculation number |
| 105 | 1 | On-hand flag<br>1 - Yes<br>0 - No |
| 106 | 1 | Revise flag<br>1 - Yes<br>0 - No |
| 107 | 2 | Extra lines on report<br>1 - Yes<br>0 - No |
| 109 | 5 | Percentage up/down |
| 114 | 1 | Suppress zero record from report<br>1 - Suppress from report<br>0 - Do not suppress from report |
| 115 | 1 | Save production to INV files<br>1 - Yes<br>0 - No |
| 116 | 5 | Permanent number |
| 121 | 25 | Comments |
| 146 | 35 | Filler |

File Stats for DPPMST.ATH

Record Length = 180
Variable Records = No
Number of Keys = 3
Page Size = 1024

| Key | Position | Length | Duplicates | Modifiable | Type |
|---|---|---|---|---|---|
| 0 | 1 | 11 | No | Yes | String |
| 1 | 1 | 5 | Yes | Yes | String |
| 1 | 10 | 2 | Yes | Yes | String |
| 2 | 12 | 9 | Yes | Yes | String |

DPPFRQ1.ATH - Production Planner Frequency Code Lookup File

File Description:

This file stores the key information that maps to the appropriate frequency rules. This data is keyed on open and close times. The key will associate the open and close times to the specific record in the DPPFRQ2.ATH - Production Planner Frequency Table file. This file is authored in the PRODUCTION PLANNER maintenance program, DPPMNT.EXE.

Field Format:

| POSITION | LENGTH | KEY | DESCRIPTION |
|---|---|---|---|
| 1 | 3 | 0a | Department number |
| 4 | 2 | 0b | Group number |
| 6 | 4 | 0c | Planning item number |
| 10 | 4 | 0d | Open time (military) |
| 14 | 4 | 0e | Close Time (military) |
| 18 | 3 | | Frequency code |
| 21 | 20 | | Filler |

File Stats for DPPFRQ1.ATH

Record Length = 40
Variable Records = No
Number of Keys = 1
Page Size = 1024

| Key | Position | Length | Duplicates | Modifiable | Type |
|---|---|---|---|---|---|
| 0 | 1 | 17 | No | Yes | String |

DPPFRQ2.ATH - Production Planner Frequency Table

File Description:

This file stores the relational data for the planning of frequency-related production items. All offsets, planning windows, and calculation fields are defined as numeric or calculations. The file is authored in the PRODUCTION PLANNER maintenance program, DPPMNT.EXE.

Field Format:

| POSITION | LENGTH | KEY | DESCRIPTION |
|---|---|---|---|
| 1 | 3 | 0a | Frequency code |
| 4 | 2 | 0b | Sequence number of plan |
| 6 | 1 | | Relative SLS curve positioning<br>O - Relative to open<br>C - Relative to close<br>N - Relative to noon |
| 7 | 8 | | Offset (+-)<br>(calculation)<br>(SLS curve positioning) |
| 15 | 8 | | Planning window<br>(calculation)<br>(SLS curve positioning) |
| 23 | 1 | | Relative WRK positioning |
| 24 | 8 | | Offset<br>(WRK positioning) |
| 32 | 8 | | Prep time<br>(calculation)<br>(WRK positioning) |
| 40 | 8 | | Calculation record number |
| 48 | 3 | | Filler |

File Stats for DPPFRQ2.ATH

Record Length = 50
    Variable Records = No
    Number of Keys = 1
    Page Size = 1024

| Key | Position | Length | Duplicates | Modifiable | Type |
|---|---|---|---|---|---|
| 0 | 1 | 3 | No | Yes | String |
| 0 | 4 | 2 | No | Yes | String |

DPPWRK.DDF - Production Planner Work Time File

File Description:

This file stores the actual work quantities for the day planned as defined in the planning rules. The data is stored by the periods per hour authored in the PRODUCTION PLANNER parameters screen. This file is an output file generated by the PRODUCTION PLANNER projections program, DPPPRJ.EXE. The record length is a minimum of 30. The quantities for date field is variable length of 384.

Field Format:

| POSITION | LENGTH | KEY | DESCRIPTION |
|---|---|---|---|
| 1 | 6 | 0a | Production date |
| 7 | 6 | 1a | Sales date (delete on) |
| 13 | 3 | 0b 1b | Department |
| 16 | 2 | 0c 1c | Group number |
| 18 | 1 | 0d | Quantity or on-hand flag |
|   |   |   | 0 - Original quantities |
|   |   |   | 1 - Modified quantities |
|   |   |   | 2 - On-hand quantities |
|   |   |   | 3 - Unsold 1 |
|   |   |   | 4 - Unsold 2 |
|   |   |   | 5 - Unused |
|   |   |   | 6 - Preparation time |
| 19 | 4 | 0e | Production planning item |
| 23 | 2 | 0f | Display group key |
| 25 | 6 |   | Filler |
| 31 | (384) |   | Quantities for date, stored float-4 bytes |
|   |   |   | (Start storing 12 to 12:15 am at 00:00 hrs) |
|   |   |   | 0 - Original quantities |
|   |   |   | 1 - Modified quantities |

File Stats for DPPWRK.DDF

Record Length = 30
    Variable Records = Yes
    Free Space Threshold = 5%
    Number of Keys = 2
    Page Size = 1024

| Key | Position | Length | Duplicates | Modifiable | Type |
|---|---|---|---|---|---|
| 0 | 1 | 6 | No | Yes | String |
| 0 | 13 | 12 | No | Yes | String |
| 1 | 7 | 11 | Yes | Yes | String |

SLSCAL.ATH - Sales Calculation File

File Description:

This file stores the calculations used to project sales in the SALES FORECASTING module. This file can be authored in the SALES FORECASTING function, SLS.EXE FUNC=20.

Field Format:

| POSITION | LENGTH | KEY | DESCRIPTION |
|---|---|---|---|
| 1 | 3 | 0a | Calculation number |
| 4 | 25 | | Description |
| 29 | var | | Calculation |

File Stats for SLSCAL.ATH

Record Length = 28
    Variable Records = Yes
    Number of Keys = 1
    Page Size = 1024
    Total Records = 0
    Free Space Threshold = 5%

| Key | Position | Length | Duplicates | Modifiable | Type |
|---|---|---|---|---|---|
| 0 | 1 | 3 | No | Yes | String |

DPPCAL.ATH - Production Planner Calculations File

File Description:

This file stores the calculations required for the planning of items. This file is authored in the PRODUCTION PLANNER maintenance program, DPPMNT.EXE. The record length of this file must be at least 28. The calculation field is variable length of 80.

Field Format:

| POSITION | LENGTH | KEY | DESCRIPTION |
|---|---|---|---|
| 1 | 3 | 0a | Key (numeric) |
| 4 | 25 | | Description |
| 29 | (80) | | Calculation |

File Stats for DPPCAL.ATH

Record Length = 28
Variable Records = Yes
Free Space Threshold = 5%
Number of Keys = 1
Page Size = 1024

| Key | Position | Length | Duplicates | Modifiable | Type |
|---|---|---|---|---|---|
| 0 | 1 | 3 | No | Yes | String |

LOCMST.ATH - Location Master File

File Description:

This file defines location-specific configuration values. Some key values are reserved for specific program functions while others have user-defined functions. System directory information on files for specific modules/programs is stored in this file. Use the SYSMNT.EXE program (FUNC=3) to update this file.

Field Format:

| POSITION | LENGTH | KEY | DESCRIPTION |
|---|---|---|---|
| 1 | 3 | 0a | Key |
| 4 | 5 | 0b | Subkey |
| 9 | 3 | | Data types |
| 12 | 25 | | Description |
| 37 | var | | Data |

File Stats for LOCMST.ATH

Record Length = 36
    Variable Records = Yes
    Free Space Threshold = 5%
    Number of Keys = 1
    Page Size = 1024

| Key | Position | Length | Duplicates | Modifiable | Type |
|---|---|---|---|---|---|
| 0 | 1 | 3 | No | No | String |
| 0 | 4 | 5 | No | No | String |

SLSPIDX.ATH - Sales Price Index File

File Description:

This file stores the price index changes by effective date. It contains the price index for the price area to which a specific location is assigned. The price index is authored by the SALES FORECASTING module function SLS.EXE FUNC=20 function, or downloaded from the Host.

Field Format:

| POSITION | LENGTH | KEY | DESCRIPTION |
|----------|--------|-----|-------------|
| 1        | 3      | 0a  | Department #|
| 4        | 6      | 0b  | Date        |
| 10       | 10     |     | Price index |
| 20       | 1∝     |     | Filler      |

File Stats for SLSPIDX.ATH

Record Length = 30
    Variable Records = No
    Compressed Records = No
    Number of Keys = 1
    Page Size = 1024

| Key | Position | Length | Duplicates | Modifiable | Type   |
|-----|----------|--------|------------|------------|--------|
| 0   | 1        | 3      | No         | No         | String |
| 0   | 4        | 6      | No         | No         | String |

SLSPRC.ATH - Sales Price File

File Description:

This file stores price information for a price area. Fields are updated by the SLS.EXE FUNC=2 function in the SALES FORECASTING module.

Field Format:

| POSITION | LENGTH | KEY | DESCRIPTION |
|---|---|---|---|
| 1 | 3 | 0a | Department number (0 - all) |
| 4 | 1 | 0b | Group |
| 5 | 5 | 0c | Key |
| 10 | 2 | 0d 1a | Price area |
| 12 | 6 | 0e 1b | Date |
| 18 | 10 | | Price |
| 28 | 2 | | Filler |

File Stats for SLSPRC.ATH

Record Length = 30
    Variable Records = No
    Number of Keys = 2
    Page Size = 1024

| Key | Position | Length | Duplicates | Modifiable | Type |
|---|---|---|---|---|---|
| 0 | 1 | 3 | No | Yes | String |
| 0 | 4 | 1 | No | Yes | String |
| 0 | 5 | 5 | No | Yes | String |
| 0 | 10 | 2 | No | Yes | String |
| 0 | 12 | 6 | No | Yes | String |
| 1 | 10 | 6 | Yes | Yes | String |

DPPTBL.ATH - Production Planner Lookup Table

File Description:

This file stores lookup information to be used in the planning of an item. Any sent value that is less than or equal to the key and sent value in the table will return the return value. This file is authored in the PRODUCTION PLANNER maintenance program, DPPMNT.EXE.

Field Format:

| POSITION | LENGTH | KEY | DESCRIPTION |
|----------|--------|-----|-------------|
| 1        | 8      | 0a  | Key (alpha) |
| 9        | 10     | 0b  | Sent value  |
| 19       | 10     |     | Return value |
| 29       | 2      |     | Filler      |

File Stats for DPPTBL.ATH

Record Length = 30
Variable Records = No
Number of Keys = 1
Page Size = 1024

| Key | Position | Length | Duplicates | Modifiable | Type   |
|-----|----------|--------|------------|------------|--------|
| 0   | 1        | 8      | No         | No         | String |
| 0   | 9        | 10     | No         | No         | String |

SLSTBL.ATH - Sales Table File

File Description:

This file contains general lookup information for calculations by the SALES FORECASTING module. Fields are authored by the SLS.EXE FUNC=20 function.

Field Format:

| POSITION | LENGTH | KEY | DESCRIPTION |
|---|---|---|---|
| 1 | 8 | 0a | Key (Alphanumeric) |
| 9 | 10 | 0b | Sent value |
| 19 | 10 |  | Return value |
| 29 | 2 |  | Filler |

File Stats for SLSTBL.ATH

Record Length = 30
    Compressed Records = No
    Variable Records = No
    Number of Keys = 1
    Page Size = 1024

| Key | Position | Length | Duplicates | Modifiable | Type |
|---|---|---|---|---|---|
| 0 | 1 | 8 | No | No | String |
| 0 | 9 | 10 | No | No | String |

We claim:

1. A computer implemented production scheduling system for projecting future business demand in a plurality of time intervals in at least one business day, for at least one business item, accounting for recurring variations in actual business demand for the business item, and for scheduling production of the business item, the system comprising:

a memory divided into separate files including a database of day models, each day model defining any recurring business event affecting a volume or distribution of actual business demand data for at least one business item over a plurality of time intervals during the business day, and including a past business demand curve for each business item, each past business demand curve containing in each of the plurality of time intervals during a business day a percentage of total actual business demand for a business item, and including a sales day file for storing for each business day at least one day model, each day model including at least one past product demand curve;

a data input means for receiving and entering actual business demand data, and for storing the actual business demand data in the memory;

a target projection means coupled to the memory for projecting for a business item a target total demand for at least one business day according to the past business demand curve for the business item in at least one day model, the target means storing the target total demand in the memory;

an interval projection means coupled to the memory for projecting for the business item an interval business demand curve for the plurality of future time intervals by distributing the projected target total demand for the business item over the future time intervals according to the past business demand curve for the business item, for projecting for each future time interval, business demand for the business item, the interval projection means storing the interval business demand curve in the memory;

monitoring means coupled to the memory, for monitoring actual business demand data for the business item in selected past time intervals, and storing the actual business demand data in the memory;

revision means coupled to the memory, for retrieving from the memory the interval business demand curve, and the actual business demand data for the business item in the selected past time intervals, and revising the interval business demand curve for a current and selected future time intervals in response to variations in the business demand data for the business item in the selected past time intervals relative to the projected interval business demand curve for the selected past time intervals for the business item to provide a revised projected interval business demand in the selected future time intervals for the business item; and production schedule means coupled to the memory for producing a production schedule for the business item according to the projected target total demand, and the interval business demand curve.

2. The system according to claim 1 further comprising:

a day model authoring means for defining and storing in the memory a plurality of day models.

3. The system according to claim 1 further comprising:

a master demand curve definition authoring means for defining and storing in the memory, a plurality of master demand curve definitions, each master demand curve definition representing a selected business item for which past actual business demand data is represented in a past business demand curve, and including a weighting factor for applying the past actual business demand data for the business item to the past business demand curve for the business item.

4. The system according to claim 1, wherein the interval projection means for projecting for a business item an interval business demand comprises:

means for defining at least one business item for production in accordance with the projected target total demand for the business item; and, means for defining a task schedule for at least one task associated with production of the business item.

5. The system according to claim 1 wherein:

the data input means includes means for defining and storing in the memory location specific factors contributing to production of the business item; and, wherein the interval projection means includes means for adjusting the interval business demand curve according to the location specific factors.

6. The system according to claim 1 wherein the interval projection means for projecting for a business item an interval business demand curve comprises:

means for defining for the business item a function for projecting target total demand over a plurality of selected time intervals using pre-defined operators for accessing past actual business demand data stored in the memory.

7. The system according to claim 1 wherein the target projection means for projecting for a business item the target total demand over a plurality of future time intervals comprises:

means for selecting at least one business day for projecting the target total demand for the business item;

means for determining a day model for the business day;

means for selecting a calculation rule for determining the projected target total demand for the business item;

means for determining the projected target total demand by applying the calculation rule to actual business demand data for the business item; and means for storing in/he memory the projected target total demand for the business item for the selected business day.

8. The system according to claim 1 wherein the interval projection means for projecting for a business item an interval business demand curve defines the projected interval business demand in each of the plurality of time intervals as a percentage of target total demand for the business item for the plurality of time intervals, according to percentage variations in volume or distribution of actual business demand data for the business item in the past business demand curve for the business item in a selected day model.

9. The system according to claim 1 further comprising:

updating means for periodically updating the past business demand curve for the business item with actual business demand data for recent past time intervals, the actual business demand data applied to the past business demand curve according to a weighting factor.

10. The system according to claim 9, further comprising:

means for selecting at least one business day for updating in the memory;

means for determining the day model associated with the selected business day in the sales day file;

means for retrieving from the database the past business demand curves of the day model associated with the selected business day;

means for retrieving from the database the actual business demand data for each business item for which there is a past product demand curve in the day model;

means for updating the past business demand curve for a business item, where the updated past business demand curve in each time interval equals (the actual business demand data for the business item in the time interval multiplied by the weighting factor for the past business demand curve), plus, (one minus the weighting factor, multiplied by the past business demand curve in the time interval); and means for storing the updated past business demand curve in the memory.

11. The system according to claim 1, wherein the revision means for revising the interval business demand curve comprises:

means for retrieving from the memory the projected target total demand for the business item for the business day including the selected past time intervals monitored;

means for retrieving from the memory the actual business demand data for the business item for the selected past time intervals;

means for determining as a percentage of the projected target total demand the actual business demand data for the selected past time intervals;

means for determining a differential between the projected interval business demand through the selected past time intervals and the actual business demand data through the selected past time intervals; and means for revising the projected interval business demand curve in selected future time intervals according to the differential.

12. The system according to claim 1 wherein the revision means for revising the interval business demand curve comprises:

means for determining a differential between the projected interval business demand for a business item in the selected past time intervals and business demand data in the selected past time intervals for revising the projected interval business demand curve for the business item through selected future time intervals where the differential exceeds a defined threshold by adjusting the projected interval business demand curve for the selected future time intervals by the differential between the projected interval business demand curve and the past actual business demand data.

13. The system according to claim 1 wherein the revision means for revising the interval business demand curve comprises:

means for determining a differential between the projected interval business demand for a business item in the selected past time intervals and business demand data in the selected past time intervals for revising the interval business demand curve for the business item through selected future time intervals where the differential is between a negative threshold and a zero value by increasing the projected interval business demand curve for the selected future time intervals by a positive value of the differential multiplied by a percentage of projected target total demand for the business item remaining in the selected future time intervals.

14. The system according to claim 1 wherein the revision means for revising the interval business demand curve comprises:

means for executing at least one of a plurality of different logic manipulations revising the projected interval business demand in the selected future time intervals in response to deviations of actual business demand data from the projected interval business demand in selected past time intervals.

15. The system according to claim 1 comprising:

means for displaying the projected target total demand for a business day, the interval business demand for selected time intervals, the business demand data for the selected time intervals, and the revised interval business demand curve for recent past, current, and near-future time intervals for the business items.

16. The system according to claim 1 wherein:

the input means receives actual business demand data for the business items and time intervals from an electronic signalling means receiving data signals indicative of the actual business demand data.

17. The system according to claim 1 wherein:

the memory receives and stores in the database actual business demand data for the business items in quarter hour intervals.

18. The system according to claim 1 wherein the revision means for revising the interval business demand curve comprises:

means for determining a differential between the projected interval business demand for a business item in the selected past time intervals and business demand data in the selected past time intervals for revising the interval business demand curve for the business item through selected future time intervals where the differential exceeds a negative threshold by decreasing the projected interval business demand curve for the selected future time intervals by a positive value of the differential, and increasing the projected interval business demand by a growth factor.

19. A computer implemented method for projecting future business demand data in a plurality of time intervals during at least one business day for a plurality of business items, for producing selected business items during the business day, accounting for recurring variations in actual business demand data, the method operable in a computer system including a memory for storing a plurality of files and procedures, the method comprising the steps of:

authoring a demand curve master file, including a master demand curve definition for each business item and a weighting factor, each master demand curve definition associated with at least one day model, and storing the demand curve master file in the memory;

storing in the memory a past business demand curve file comprising a plurality of past business demand curves, each past business demand curve comprising actual business demand data for a business item in a plurality of time intervals as percentages of total actual business demand data for the business item over the plurality of time intervals, wherein there is one past business demand curve for each master demand curve definition associated with each day model;

storing in the memory an actual business demand file including actual business demand data for each business item in each of a plurality of time intervals;

storing in the memory a sales day file including actual business demand data for each business item on each business day, and associating with each business day at least one day model;

periodically updating the plurality of past business demand curves in the past business demand curve file for recent past time intervals by applying the actual business demand data for each business item in each recent past time interval from the actual business demand file to the past business demand curve for the business item according to the weighting factor of the master demand curve definition in the demand curve master file, and storing the updated past demand demand curves in the memory;

projecting a target total demand for each business item over a plurality of time intervals, and storing each target total demand in the memory;

projecting an interval business demand for each business item in each of a plurality of future time intervals and storing each interval business demand in the memory;

displaying the target total demand, and interval business demand for selected business items;

producing selected business items in the plurality of time intervals according to the projected interval business demand for the selected business items;

monitoring actual business demand data for the selected business items in selected past time intervals;

revising the interval business demand for the selected business items for a current and selected future time intervals in response to the variations in actual business demand data in the selected past time intervals relative to the projected interval business demand for the selected past time intervals to revise the projected interval business demand for plurality of business items in the selected future time intervals; and, producing the selected business items in the selected future time intervals according to the revised projected interval business demand.

20. The method according to claim 19, further comprising the steps of:

authoring a day model file including a plurality of day models, each day model representing a recurring business event affecting a volume or distribution of actual business demand data for the business items over a plurality of time intervals;

associating each day model with a day model designator;

defining an opening and closing operating time associated with the day model; and storing the day model file in the memory.

21. The method according to claim 20 where the step of periodically updating a plurality of past business demand curves further comprises the steps of:

selecting at least one business day to be updated;

retrieving from the sales day file the day model associated with a selected business day;

determining frown the day model file which past business demand curves in the past business demand curve file to update according to the day model associated with the selected business day, and retrieving the past business demand curves for the day model from past business demand curve file;

retrieving from the actual business demand file actual business demand data for each business item in a plurality of time intervals of the selected business day;

updating the past business demand curve for each business item, where an updated value of the past business demand curve in each time interval equals (actual business demand data in the time interval multiplied by the weighting factor for the past business demand curve) plus, (one minus the weighting factor, multiplied by the value of the past business demand curve); and storing the updated past business demand curves in the past business demand curve file.

22. The method according to claim 19, where the step of authoring the demand curve master file further comprises the steps of:

defining a master demand curve definition for at least one business item;

designating a descriptor for each master demand curve definition; and designating for each master demand curve definition a weighting factor for updating the past business demand curves in the past business demand curve file for weighting actual business demand data for a business item from the actual business demand file relative to the past business demand curve for the business item.

23. The method according to claim 19 further comprising the steps of:

authoring a calculations rules file, and storing the calculations rules file in the memory;

authoring a target master file by:

designating selected business items for which the target total demand is to be projected;

designating for each selected business item at least one calculation rule in a calculation rules file for determining the projected target total demand over a plurality of time intervals using actual business demand data stored in the sales day file; and storing the projected target total demand in the memory.

24. The method according to claim 23 where the step of authoring the calculations rules file further comprises the steps of:

defining a plurality of calculations rules, each calculation rule comprising a plurality of functions, operators, or variables, for retrieving from the memory actual business demand data and curves, and for calculating projected target total demand; and storing the calculations rules file in the memory.

25. The method according to claim 23 further comprising the steps of:

authoring a production planning master file by:

defining a plurality of business items to be produced, and at least one production task for producing each business items;

defining for each production task a frequency factor for determining a frequency for the production task;

selecting, for each business item or production task, a calculation rule from the calculations rules file for determining in conjunction with the frequency factor, the frequency for producing the business item or production task; and storing the production planning master file in the memory.

26. The method according to claim 25 further comprising the steps of:

authoring a production planning frequency file by:

designating a plurality of production tasks from the production planning master file;

defining a production starting time, a production ending time, or a duration value, and a frequency factor for each production task;

storing the production planning frequency file in the memory; and, producing the selected business item using at least one production task according its frequency factor and the production times to provide the projected interval business demand for the selected business items in selected future time intervals.

27. The method according to claim 23 where the step of determining the projected target total demand for each business item over a plurality of time intervals further comprises the steps of:

selecting at least one business day for projecting the target total demand for the plurality of business items;

retrieving from the sales day file a day model associated with the selected business day, the day model associated with selected master demand curve definitions, each master demand curve definition associated with a past business demand curve;

determining in the target master file the plurality of business items for which the target total demand is to be projected;

projecting for each business item the target total demand using a calculation rule in the calculations rules file to access and accumulate total demand for the business item from the past business demand curve associated with the master demand curve definition and the day model; and storing the projected target total demand for each business item for the selected business day in the memory.

28. The method according to claim 19 where the step of projecting for each business item the interval business demand for a plurality of future time intervals further comprises the steps of:

selecting a business day for projecting the business demand data in each of the plurality of time intervals;

retrieving from the memory the projected target total demand for the business items for the selected business day and the day model associated with the selected business day;

retrieving from the calculations rules file a calculation rule;

retrieving from the past business demand curve file a past business demand curve for each business item for the retrieved day model of the selected business day;

projecting for each time interval, the interval business demand for each business item by applying the projected target total demand for each business item for the business day to the time interval according to the calculation rule; and storing the interval business demand for the business items in a production planning work file for use in producing the business items.

29. The method according to claim 19 where the step of revising the interval business demand for the selected business items comprises the steps of:

retrieving from the memory the projected target total demand for the selected business items for the selected past time interval;

retrieving from the actual business demand file the actual business demand data for the selected business items;

determining for each selected business item a percentage differential between the projected target total demand for the business item through the selected past time intervals and the actual business demand data for the business item through the selected past time intervals; and revising the projected interval business demand in the selected future time intervals according to the percentage differential.

30. The method according to claim 29 where the step of revising the projected interval business demand in the selected future time intervals according to the percentage differential comprises the step of:

adjusting the projected interval business demand for the future time intervals by the percent differential between the projected interval business demand and the past actual business demand data, where the percent differential exceeds a defined threshold.

31. The method according to claim 29 where the step of revising the projected interval business demand in the selected future time intervals according to the percentage differential comprises the step of:

executing at least one logic manipulation to revise the projected interval business demand in the selected future time intervals in response to the deviations of actual business demand data compared with the projected interval business demand in selected past time intervals.

32. The method according to claim 29 where the step of revising the projected interval business demand in the selected future time intervals according to the percentage differential comprises the step of:

increasing the projected interval business demand for the selected future time intervals by a positive value of the percentage differential multiplied by a percentage of projected target total demand remaining in the future tune intervals, where the percentage differential is between a negative threshold and a zero value.

33. The method according to claim 29 where the step of revising the projected interval business demand in the selected future time intervals according to the percentage differential comprises the step of:

decreasing the projected interval business demand for the future time intervals by the percent differential between the projected interval business demand and the past actual business demand data, and, increasing the projected interval business demand by a growth factor, where the percent differential exceeds a negative threshold.

34. The method according to claim 19 where actual business demand data is stored in the actual business demand file in quarter hour intervals.

35. The method according to claim 19 where past actual business demand data is stored in the past business demand curve file in quarter hour intervals.

* * * * *

UNITED STATES PATENT AND TRADEMARK OFFICE
CERTIFICATE OF CORRECTION

PATENT NO. : 5,459,656
DATED : October 17, 1995
INVENTOR(S) : Randall K. Fields, Paul R. Quinn, Barrie R. Tondevold and Jamie T. Pond It is certified that error appears in the above-indentified patent and that said Letters Patent is hereby corrected as shown below:

Column 1, line 10, delete "Tondevoid" and insert —Tondevold—

Column 56, line 43, delete "in/he" and insert —in the—

Column 59, line 10, delete "demand"

Column 59, line 54, delete "frown" and insert —from—

Signed and Sealed this

Fifth Day of March, 1996

BRUCE LEHMAN

Attest:

Attesting Officer

Commissioner of Patents and Trademarks